US011157582B2

(12) United States Patent
Bergel et al.

(10) Patent No.: US 11,157,582 B2
(45) Date of Patent: Oct. 26, 2021

(54) DATA COMMUNICATION SYSTEM

(71) Applicant: SONOS EXPERIENCE LIMITED, Hayes (GB)

(72) Inventors: Patrick Bergel, London (GB); Anthony James Steed, Hertfordshire (GB)

(73) Assignee: Sonos Experience Limited, Hayes (GB)

(*) Notice: Subject to any disclaimer, the term of this patent is extended or adjusted under 35 U.S.C. 154(b) by 0 days.

(21) Appl. No.: 16/012,167

(22) Filed: Jun. 19, 2018

(65) Prior Publication Data
US 2018/0300420 A1    Oct. 18, 2018

Related U.S. Application Data

(63) Continuation of application No. 12/926,470, filed on Nov. 19, 2010, now Pat. No. 10,025,870.

(30) Foreign Application Priority Data

Oct. 1, 2010 (GB) ...................... 1016542

(51) Int. Cl.
*G06Q 20/32* (2012.01)
*G06F 16/955* (2019.01)
(Continued)

(52) U.S. Cl.
CPC .......... *G06F 16/955* (2019.01); *G06Q 20/40* (2013.01); *G06Q 30/0225* (2013.01); *G06Q 20/32* (2013.01); *G06Q 20/3272* (2013.01)

(58) Field of Classification Search
CPC .... G06Q 30/02; G06Q 20/32; G06Q 20/3272; G06Q 20/40975; G06Q 20/3274
See application file for complete search history.

(56) References Cited

U.S. PATENT DOCUMENTS 6,133,849 A * 10/2000 McConnell ............ H04B 11/00
                                                    340/12.54
6,163,803 A    12/2000 Watanabe
(Continued)

FOREIGN PATENT DOCUMENTS

EP    1760693 A1    3/2007
EP    3275117 A1    1/2018
(Continued)

OTHER PUBLICATIONS

English summary of Notice of Rejection for Japanese Application No. 2013-530801, dated Jun. 23, 2015, three pages.
(Continued)

*Primary Examiner* — Thomas H Maung
(74) *Attorney, Agent, or Firm* — Nixon & Vanderhye, P.C.

(57) ABSTRACT

The present invention relates to systems for communicating data. In particular, systems for communicating data to and from mobile devices are described. One system involves the use of a server to store the association between a shortcode and the data. A user device can be used to transmit the shortcode to a second user device. The second user device can then access the association at the server to access the data. The shortcode is transmitted via an audibly unique signal between the two devices. Further devices, systems, and methods for redeeming vouchers, transferring money, unlocking content on a device, and authenticating transactions all using audio are also disclosed. A method for managing data communication on a mobile device is further disclosed. In addition, a system for asynchronous transmission of the data is disclosed by use of reserving a shortcode at a server before the shortcode is associated with data.

29 Claims, 15 Drawing Sheets

(51) Int. Cl.
G06Q 20/40 (2012.01)
G06Q 30/02 (2012.01)

(56) References Cited

U.S. PATENT DOCUMENTS

| | | | |
|---|---|---|---|
| 6,532,477 | B1 | 3/2003 | Tang |
| 6,909,999 | B2 | 6/2005 | Thomas et al. |
| 6,996,532 | B2 | 2/2006 | Thomas |
| 7,058,726 | B1 | 6/2006 | Osaku |
| 7,349,668 | B2 | 3/2008 | Ilan et al. |
| 7,379,901 | B1 | 5/2008 | Philyaw |
| 7,403,743 | B2 | 7/2008 | Welch |
| 7,944,847 | B2 | 5/2011 | Trine et al. |
| 8,494,176 | B2 | 7/2013 | Suzuki et al. |
| 8,594,340 | B2 | 11/2013 | Takara et al. |
| 9,137,243 | B2 | 9/2015 | Suzuki et al. |
| 9,344,802 | B2 | 5/2016 | Suzuki et al. |
| 2002/0107596 | A1 | 8/2002 | Thomas et al. |
| 2002/0152388 | A1 | 10/2002 | Linnartz et al. |
| 2003/0065918 | A1 | 4/2003 | Willey |
| 2003/0212549 | A1 | 11/2003 | Steentra et al. |
| 2004/0133789 | A1 | 7/2004 | Gantman et al. |
| 2004/0264713 | A1 | 12/2004 | Grzesek |
| 2005/0049732 | A1* | 3/2005 | Kanevsky ............ H04B 11/00 700/94 |
| 2005/0086602 | A1 | 4/2005 | Philyaw et al. |
| 2005/0219068 | A1 | 10/2005 | Jones et al. |
| 2006/0167841 | A1 | 7/2006 | Allan |
| 2007/0063027 | A1 | 3/2007 | Belfer et al. |
| 2007/0121918 | A1 | 5/2007 | Tischer |
| 2007/0192672 | A1 | 8/2007 | Bodin et al. |
| 2007/0192675 | A1 | 8/2007 | Bodin et al. |
| 2008/0002882 | A1 | 1/2008 | Voloshynovskyy |
| 2008/0011825 | A1 | 1/2008 | Giordano et al. |
| 2008/0027722 | A1 | 1/2008 | Haulick et al. |
| 2008/0031315 | A1 | 2/2008 | Ramirez et al. |
| 2008/0059157 | A1 | 3/2008 | Fukuda et al. |
| 2008/0112885 | A1 | 5/2008 | Okunev et al. |
| 2008/0232603 | A1 | 9/2008 | Soulodre |
| 2008/0242357 | A1 | 10/2008 | White |
| 2008/0262928 | A1* | 10/2008 | Michaelis .......... G06Q 30/0225 705/14.26 |
| 2009/0141890 | A1* | 6/2009 | Steenstra ........... G06Q 20/3272 380/44 |
| 2009/0254485 | A1 | 10/2009 | Baentsch et al. |
| 2010/0030838 | A1 | 2/2010 | Atsmon et al. |
| 2010/0064132 | A1 | 3/2010 | Ra Vikiran Sureshbabu |
| 2010/0088390 | A1 | 4/2010 | Bai et al. |
| 2010/0134278 | A1 | 6/2010 | Srinivasan et al. |
| 2010/0146115 | A1* | 6/2010 | Bezos .................... H04W 4/21 709/225 |
| 2010/0223138 | A1* | 9/2010 | Dragt .................... G06Q 30/02 705/14.64 |
| 2010/0267340 | A1 | 10/2010 | Lee |
| 2011/0277023 | A1 | 11/2011 | Meylemans et al. |
| 2012/0084131 | A1 | 4/2012 | Bergel et al. |
| 2013/0010979 | A1 | 1/2013 | Takara et al. |
| 2013/0030800 | A1 | 1/2013 | Tracey et al. |
| 2013/0034243 | A1 | 2/2013 | Yermeche et al. |
| 2013/0077798 | A1 | 3/2013 | Otani et al. |
| 2013/0216058 | A1 | 8/2013 | Furuta et al. |
| 2013/0223279 | A1 | 8/2013 | Tinnakornsrisuphap et al. |
| 2014/0028818 | A1 | 1/2014 | Brockway, III et al. |
| 2014/0046464 | A1 | 2/2014 | Reimann |
| 2014/0053281 | A1 | 2/2014 | Benoit et al. |
| 2014/0164629 | A1 | 6/2014 | Barth et al. |
| 2014/0172141 | A1 | 6/2014 | Mangold |
| 2015/0004935 | A1 | 1/2015 | Fu |
| 2015/0088495 | A1 | 3/2015 | Jeong et al. |
| 2015/0141005 | A1 | 5/2015 | Suryavanshi et al. |
| 2016/0098989 | A1 | 4/2016 | Layton et al. |
| 2017/0279542 | A1 | 9/2017 | Knauer et al. |
| 2020/0105128 | A1 | 4/2020 | Frank |

FOREIGN PATENT DOCUMENTS

| | | |
|---|---|---|
| EP | 3526912 A1 | 4/2018 |
| GB | 2369995 | 6/2002 |
| JP | H10-78928 | 3/1998 |
| JP | 2001-320337 | 11/2001 |
| JP | 2004-512765 | 4/2004 |
| JP | 2004-139525 | 5/2004 |
| JP | 2007-121626 | 5/2007 |
| JP | 2007-195105 | 8/2007 |
| JP | 2008-219909 | 9/2008 |
| WO | 2001/15021 | 3/2001 |
| WO | 2001/50665 | 7/2001 |
| WO | 0161987 A2 | 8/2001 |
| WO | 0163397 A1 | 8/2001 |
| WO | 2002/35747 | 5/2002 |
| WO | 2004002103 A1 | 12/2003 |
| WO | 2005006566 A2 | 1/2005 |
| WO | 2008/131181 | 10/2008 |
| WO | 2016094687 A1 | 6/2016 |

OTHER PUBLICATIONS

English summary of Notice of Rejection for Japanese Application No. 2013-530801, dated Jul. 5, 2016, four pages.
English summary of Decision of Rejection for Japanese Application No. 2013-530801, dated Apr. 4, 2017, four pages.
Gerasimov et al. "Things That Talk", http://vadim.oversigma.com/TTT_Paper/TTT.html, printed Aug. 24, 2010, 17 pages.
Lopes et al. Pervasive computing, "Acoustic Modems for Ubiquitous Computing", Jul.-Sep. 2003 IEEE, pp. 62-71.
Madhavapeddy et al. Pervasive computing, "Audio Networking: The Forgotten Wireless Technology", Jul. Sep. 2005 IEEE, pp. 55-60.
Madhavapeddy et al. "Context-Aware Computing with Sound" http://www.cl.cam.ac.uk/research/srg/netos/papers/2003-ubicomp-audio.pdf, 18 pages.
Madhavapeddy, "Audio Networking for Ubiquitous Computing", http://www.recoil.org/~avsm/audio.pdf, Oct. 24, 2003, pp. 1-11.
Soriente et al., "HAPADEP: Human-Assisted Pure Audio Device Pairing*", http://citeseerx.ist.psu.edu/viewdoc/download?doi=10.1.1.164.6927&rep=repl&type=pdf, 11 pages.
Bourguet et al. "A Robust Audio Feature Extraction Algorithm for Music Identification," AES Convention 129; Nov. 4, 2010, 7 pages.
European Patent Office, Decision to Refuse dated Nov. 13, 2019, issued in connection with European Patent Application No. 11773522.5, 52 pages.
European Patent Office, European Extended Search Report dated Aug. 31, 2020, issued in connection with European Application No. 20153173.8, 8 pages.
European Patent Office, Summons to Attend Oral Proceedings dated Mar. 15, 2019, issued in connection with European Application No. 11773522.5-1217, 10 pages.
Final Office Action dated Oct. 16, 2014, issued in connection with U.S. Appl. No. 12/926,470, filed Nov. 19, 2010, 22 pages.
Final Office Action dated Aug. 17, 2017, issued in connection with U.S. Appl. No. 12/926,470, filed Nov. 19, 2010, 22 pages.
Final Office Action dated Nov. 30, 2015, issued in connection with U.S. Appl. No. 12/926,470, filed Nov. 19, 2010, 25 pages.
Final Office Action dated Apr. 20, 2020, issued in connection with U.S. Appl. No. 16/012,167, filed Jun. 19, 2018, 21 pages.
Glover et al. "Real-time detection of musical onsets with linear prediction and sinusoidal modeling.", 2011 EURASIP Journal on Advances in Signal Processing 2011, 68, Retrieved from the Internet URL: https://doi.org/10.1186/1687-6180-2011-68, Sep. 20, 2011, 13 pages.
Gomez et al: "Distant talking robust speech recognition using late reflection components of room impulse response", Acoustics, Speech and Signal Processing, 2008. ICASSP 2008. IEEE International Conference on, IEEE, Piscataway, NJ, USA, Mar. 31, 2008, XP031251618, ISBN: 978-1-4244-1483-3, pp. 4581-4584.
Gomez et al., "Robust Speech Recognition in Reverberant Environment by Optimizing Multi-band Spectral Subtraction", 2013 IEEE International Conference on Acoustics, Speech and Signal

(56) References Cited

OTHER PUBLICATIONS

Processing ICASSP, Jan. 1, 2008, 6 pages.
Goodrich et al., Using Audio inn Secure Device Pairing, International Journal of Security and Networks, vol. 4, No. 1.2, Jan. 1, 2009, p. 57, Inderscience Enterprises Ltd., 12 pages.
International Bureau, International Preliminary Report on Patentability and Written Opinion, dated Apr. 16, 2019, issued in connection with International Application No. PCT/GB2017/053112, filed on Oct. 13, 2017, 12 pages.
International Bureau, International Search Report and Written Opinion dated Apr. 11, 2019, issued in connection with International Application No. PCT/GB2018/053733, filed on Dec. 20, 2018, 10 pages.
International Bureau, International Search Report and Written Opinion dated Oct. 4, 2018, issued in connection with International Application No. PCT/GB2018/051645, filed on Jun. 14, 2018, 14 pages.
International Searching Authority, International Search Report and Written Opinion dated Mar. 13, 2018, issued in connection with International Application No. PCT/GB2017/053112, filed on Oct. 13, 2017, 18 pages.
International Searching Authority, International Search Report and Written Opinion dated Nov. 29, 2017, in connection with International Application No. PCT/GB2017/052787, 10 pages.
International Searching Authority, International Search Report and Written Opinion dated Nov. 30, 2011, in connection with International Application No. PCT/GB2011/051862, 6 pages.
International Searching Authority, International Search Report dated Jan. 18, 2018, issued in connection with International Application No. PCT/GB2017/053113, filed on Oct. 17, 2017, 11 pages.
International Searching Authority, International Search Report dated Jun. 19, 2018, issued in connection with International Application No. PCT/GB2018/050779, filed on Mar. 23, 2018, 8 pages.
Monaghan et al. "A method to enhance the use of interaural time differences for cochlear implants in reverberant environments.", published Aug. 17, 2016, Journal of the Acoustical Society of America, 140, pp. 1116-1129. Retrieved from the Internet URL: https://asa.scitation.org/doi/10.1121/1.4960572 Year: 2016, 15 pages.
Non-Final Office Action dated Mar. 25, 2015, issued in connection with U.S. Appl. No. 12/926,470, filed Nov. 19, 2010, 24 pages.
Non-Final Office Action dated Mar. 28, 2016, issued in connection with U.S. Appl. No. 12/926,470, filed Nov. 19, 2010, 26 pages.
Non-Final Office Action dated Jan. 6, 2017, issued in connection with U.S. Appl. No. 12/926,470, filed Nov. 19, 2010, 22 pages.
Non-Final Office Action dated Aug. 9, 2019, issued in connection with U.S. Appl. No. 16/012,167, filed Jun. 19, 2018, 15 pages.
Non-Final Office Action dated Feb. 5, 2014, issued in connection with U.S. Appl. No. 12/926,470, filed Nov. 19, 2010, 22 pages.
Non-Final Office Action dated Sep. 24, 2020, issued in connection with U.S. Appl. No. 16/012,167, filed Jun. 19, 2018, 20 pages.
Non-Final Office Action dated Jan. 29, 2021, issued in connection with U.S. Appl. No. 16/342,060, filed Apr. 15, 2019, 59 pages.
Non-Final Office Action dated Feb. 5, 2021, issued in connection with U.S. Appl. No. 16/342,078, filed Apr. 15, 2019, 13 pages.
Notice of Allowance dated Mar. 15, 2018, issued in connection with U.S. Appl. No. 12/926,470, filed Nov. 19, 2010, 10 pages.
Notice of Allowance dated Mar. 19, 2021, issued in connection with U.S. Appl. No. 16/012,167, filed Jun. 19, 2018, 9 pages.
United Kingdom Patent Office, United Kingdom Examination Report dated Feb. 2, 2021, issued in connection with United Kingdom Application No. GB1715134.1, 5 pages.
United Kingdom Patent Office, United Kingdom Office Action dated Jan. 22, 2021, issued in connection with United Kingdom Application No. GB1906696.8, 2 pages.
Wang, Avery Li-Chun. An Industrial-Strength Audio Search Algorithm. Oct. 27, 2003, 7 pages. [online]. [retrieved on May 12, 2020] Retrieved from the Internet URL: https://www.researchgate.net/publication/220723446_An_Industrial_Strength_Audio_Search_Algorithm.
United Kingdom Patent Office. United Kingdom Examination Report dated Jun. 11, 2021, issued in connection with United Kingdom Application No. GB 1716909.5, 5 pages.

\* cited by examiner

DATA COMMUNICATION SYSTEM

This application is a continuation of application Ser. No. 12/926,470, filed Nov. 19, 2010, now allowed; which claims priority benefit of United Kingdom Application No. 1016542.1, filed Oct. 1, 2010; the entire contents of each of which are hereby incorporated by reference.

FIELD OF INVENTION

The present invention is in the field of data communication. In particular, but not exclusively, the present invention relates to communicating data to and from mobile devices.

BACKGROUND

There are a number of existing methods to embed data into physical environments, including, the non-dynamic visual display of short URLs or text codes, QR codes, bar codes and RFID codes.

Posters and other print media already commonly contain text forms of URLs and/or shortcodes from URL-shortening services such as bit.ly. To use these printed text codes, one has to enter them into a web browser. These text forms require a pen or pencil, or a good memory, to retain the URL. This can be a particular problem for current URL shortening services, such as bit.ly which use difficult to remember alphanumeric strings. There are, however, alternative short coding services which use memorable codes, but it will be appreciated that there may be limited numbers of memorable codes available.

QR codes are a method for representing relatively large amounts of data (1K) in a pictograph. The code includes a header, which indicates what type of encoding the marker contains, and a payload. The code is large enough to encode a full URL or other data payload: for example, small images. The main drawbacks with QR codes include: they are relatively visibly large; the code needs to be seen up close with a camera in order that the code be recognizable; when in low-light or if the camera is moving, the decode step can fail; and the code is not human readable. Nor is it visibly obvious to human beings that two different codes are distinct.

Amongst the commonly printed codes, bar codes are a well-established coding mechanism. The semantics of the code are defined by international standards. There are online services that map the codes to different web resources (e.g. CueCat). However, bar codes share many of the disadvantages of QR codes.

RFID (Radio Frequency IDentification) tags are a way of embedding a code into a physical device that can be carried by a person or attached to an object. The code can be passively read when the RFID is close to a reading terminal. This passive, or semi-passive, code reading is highly attractive in some contexts (e.g. Oyster card), because it is tolerant of user behaviour (for example, the general proximity of the card to the reader is sufficient to facilitate the transaction). However, there are no simple tools for users to create RFID tags, and it requires hardware that is not typically available to consumers.

There are also a number of technologies for data transfer between online devices. For example, an Internet service such as email, twitter, etc., could be used. Some of these services require the user to know the identifier of the receiver. Furthermore, these Internet services require both devices to have been online at some point to confirm that the data transfer has occurred. Therefore, there is no ability to use these services asynchronously. For example, with email, or any other web service, if offline, there is no guarantee that once initiated the data transfer will conclude in the future: the email might get queued, but never sent; or the device might be stolen.

For peer to peer transfer between mobile devices, the most widely promulgated technology is Bluetooth. This is a high-bandwidth channel between two devices. However, there are usability issues and is accordingly widely shunned by users despite being nominally available on many devices. For example, synchronizing pairing of two devices is a haphazard experience, with different devices having different protocols for enabling data transfer.

There is also a growing standard around near-field communications (NFC), which essentially combines the technologies of RFID tag and reader together. The technology is a competitor to Bluetooth. One advantage is that active devices will be able to mimic static RFID tags (e.g. your phone could "mimic" your Oyster card). This means the devices will be able to interact with all existing RFID reading systems, which includes many payment and security access systems. Prototypes for NFC exist, but this technology requires users to get new handsets and devices. At present, few consumer devices with the technology are yet being marketed. It may be 3 to 5 years before NFC reaches any significant market share.

It is an object of the present invention to provide a system for communicating data which overcomes the disadvantages of the prior art, or at least provides a useful alternative.

SUMMARY OF INVENTION

According to a first aspect of the invention there is provided a device for transmitting data including:
 a receiver configured to receive a shortcode associated with data from a server;
 an encoder configured to encode the shortcode into a signal in an audibly unique format; and
 a transmitter configured to transmit the signal for audible reproduction;
 wherein the shortcode is globally unique.

The audibly unique format may include at least some birdsong and/or music. Some of the signal may not encode any of the shortcode and may include data solely to improve the aesthetic or distinctive nature of an audible reproduction of the signal. In addition, some of the signal may encode redundancy. The shortcode may include an application header. The shortcode may be an index to the data. The device may be a controller for a mobile telecommunications device The receiver may be configured to receive the shortcode over a mobile telecommunications network.

The shortcode may be of a predetermined fixed length. The shortcode may be between 32 and 1024 bits. The signal may be in a music description language format. The signal may be in MIDI format. The signal may include redundant encoding. The signal may use Reed-Solomon codes for redundancy.

The data may be a URL.

The device may further include a user input device configured to enable a user to determine the data to transmit, and a transceiver configured to transmit the data to the server.

According to a further aspect of the invention there is provided a device for receiving data including:
 a receiver configured to receive an audio signal detected by a microphone;

a decoder configured to decode the audio signal into a shortcode; and a transceiver configured to access data associated with the shortcode at a server using the shortcode; wherein the shortcode is globally unique.

The audio signal may include at least some birdsong and/or music. The shortcode may include an application header. The device may further include a processor configured to read the application header and determine processing of the shortcode in accordance with the application header.

The shortcode may be an index to the data.

The device may be a controller for a mobile telecommunications device.

The transceiver may be configured to access the data over a mobile telecommunications network.

The shortcode may be of a predetermined fixed length. The shortcode may be between 32 and 1024 bits.

The decoder may use pitch tracking to assist in decoding the audio signal.

The data may be a URL. The step of accessing the data may include retrieving the data to the device. The audio signal may be received from a device of a first aspect. The device may further include a display configured to display the shortcode and/or an audio spectrum when receiving the audio signal.

According to a further aspect of the invention there is provided a device for transmitting data asynchronously including:
 a receiver configured to receive a shortcode from a server;
 a memory configured to store the received shortcode;
 a processor configured to associate the received shortcode with data;
 a transmitter configured to transmit the received shortcode to a second device; and
 a transmitter configured to transmit the association to the server.

The device may be unable to connect to the server when transmitting the received shortcode.

The received shortcode may be transmitted to the second device over a direct interface.

The direct interface may be an audio interface.

The device and the second device may be co-located.

The device may be configured to receive and then transmit the shortcode before the association is transmitted to the server.

The device may further include a user input device configured to enable a user to determine the data to transmit.

According to a further aspect of the invention there is provided a server for transmitting data including:
 a processor configured to associate a shortcode with data;
 a memory configured to store the association;
 an encoder configured to encode the shortcode into a signal in a audibly unique format;
 a transmitter configured to transmit the signal to a device for audible reproduction;
 wherein the shortcode is globally unique.

The audibly unique format may include at least some birdsong and/or music.

The shortcode may include an application header.

The shortcode may be an index to the data.

The transmitter may be configured to transmit the signal over an mobile telecommunications network.

The transmitter may be configured to transmit the signal over a mobile telecommunications network.

The signal may be transmitted over the SMS channel as a ringtone.

The shortcode may be of a predetermined fixed length. The length of the shortcode may be between 32 and 1024 bits.

The signal may be in a music description language format.

The signal may be in MIDI format

The signal may include redundant encoding.

The signal may use Reed-Solomon codes for redundancy.

The data may be a URL.

The server may further include a receiver configured to receive the data to transmit from the device.

The device may be a mobile telecommunications device.

The server may further include a receiver configured to receive the shortcode from a second device, and a processor configured to provide access to the data associated with the received shortcode to the second device.

Access to the data may include transmitting the data to the second device.

According to a further aspect of the invention there is provided a server for transmitting data asynchronously including:
 a processor configured to reserve a shortcode in a memory;
 a transmitter configured to transmit the reserved shortcode to a device;
 a receiver configured to receive an association between the reserved shortcode and data;
 a memory configured to store the association between the reserved shortcode and the data;
 a receiver configured to receive a request from a second device,
 wherein the request includes the reserved shortcode; and
 a processor configured to associate the request with the data.

According to a further aspect of the invention there is provided a device for transmitting data including:
 a memory configured to store a signal generated by the device of the first aspect or the server of the fourth aspect; and
 an audio output configured to generate an audio signal from the stored signal.

According to a further aspect of the invention there is provided a device for authenticating transactions including:
 an input device configured to receive an authentication input from a user;
 a memory configured to store user identity information;
 an encoder configured to encode user identity information and the authentication input into a signal in an audibly unique format; and
 a transmitter configured to transmit the signal for audible reproduction.

The encoder may be further configured to encode one or more from the set of device location and device identifier into the signal. The device identifier may be an IMEI (International Mobile Equipment Identity).

According to a further aspect of the invention there is provided device for authenticating transactions including:
 a receiver configured to receive the signal generated by a second device as claimed the above aspect from a microphone; and
 a processor configured to decode user identity information and authentication data from the signal and to authenticate the second device based upon the user identity information and authentication input.

The signal may be further encoded with one or more from the set of device location and device identifier. The device identifier may be an IMEI.

The processor may authenticate the second device with reference also to one or more from the set of a history with the second device and whether a user of the user identity information is within the social network of a user of the device.

According to a further aspect of the invention there is provided a method for transmitting data including the steps of:
a) receiving a shortcode associated with data from a server;
b) encoding the shortcode into a signal in an audibly unique format; and
c) transmitting the signal for audible reproduction; wherein the shortcode is globally unique.

According to a further aspect of the invention there is provided a method for transmitting data including the steps of:
a) associating a shortcode with data;
b) encoding the shortcode into a signal in an audibly unique format; and
c) transmitting the signal to a device for audible reproduction;
wherein the shortcode is globally unique.

According to a further aspect of the invention there is provided a method for transmitting data including:
generating an audio signal from a signal stored in a memory, the stored signal previously generated by the method of either of the two preceding aspects.

According to a further aspect of the invention there is provided a method for receiving data including the steps of:
a) receiving an audio signal via a microphone;
b) decoding the audio signal into a shortcode; and
c) accessing data associated with the shortcode at a server using the shortcode; wherein the shortcode is globally unique.

According to a further aspect of the invention there is provided a method for transmitting data asynchronously including the steps of:
a) receiving a shortcode from a server;
b) storing the received shortcode on a device;
c) associating the received shortcode with data;
d) transmitting the received shortcode to a second device; and
e) transmitting the association to the server.

According to a further aspect of the invention there is provided a method for transmitting data asynchronously including the steps of:
a) reserving a shortcode;
b) transmitting the reserved shortcode to a first device;
c) receiving an association between the reserved shortcode and data;
d) storing the association between the reserved shortcode and the data;
e) receiving a request from a second device, wherein the request includes the reserved shortcode; and
f) associating the request with the data.

According to a further aspect of the invention there is provided a method for authenticating transactions including the steps of:
a) receiving an authentication input from a user via an input device;
b) encoding user identity and the authentication input into an audio signal in an audibly unique format; and
c) transmitting the audio signal for audible reproduction.

According to a further aspect of the invention there is provided a system for communicating data, including:
a server, including:
  a processor configured to associate a shortcode with data; and
  a memory configured to store the association;
an encoder configured to encode the shortcode into a signal in an audibly unique format;
a first device, including:
  a speaker; and
  a transmitter configured to transmit the signal for audible reproduction over the speaker; and
a second device, including:
  a microphone; and
  a receiver configured to receive an audio signal detected by the microphone;
  a decoder configured to decode the audio signal into a shortcode; and
  a transceiver configured to access data associated with the shortcode at a server using the shortcode;
wherein the shortcode is globally unique.

The server may include the encoder. Alternatively, the first device may include the encoder.

According to a further aspect of the invention there is provided a system for transmitting data asynchronously including:
a first device, including:
  a transceiver configured to request reservation of a shortcode from a server;
  a user input device configured to enable a user to determine data to transmit;
  a processor configured to generate an association between the data and the shortcode;
  a memory configured to store the association;
  a transmitter configured to transmit the shortcode over a direct interface to a second device; and
  a transmitter configured to transmit the association to the server;
a second device, including:
  a receiver configured to receive a shortcode over a direct interface from the first device; and
  a transceiver configured to access data associated with the shortcode at a server using the shortcode; and
a server, including:
  a receiver configured to receive a request to reserve a shortcode from a first device;
  a processor configured to reserve a shortcode in a memory;
  a transmitter configured to transmit the reserved shortcode to the first device;
  a receiver configured to receive an association between the reserved shortcode and data;
  a memory configured to store the association between the reserved shortcode and the data;
  a receiver configured to receive a request from a second device, wherein the request includes the reserved shortcode; and
  a processor configured to associate the request from the second device with the data.

One or both of the first and second devices may be unable to access the server when transmitting or receiving the shortcode over the direct interface.

The direct interface may be a direct audio interface.

The first and second devices may be co-located.

According to a further aspect of the invention there is provided a system for accessing content on a device, including:
  a processor configured to receive an audio signal directly over the air, to match the audio signal to at least one of a plurality of content elements/functionalities, and to provide access to the at least one content element/
functionality stored on the device; and
a memory configured to store the plurality of content
elements/functionalities.

The processor may be further configured to decode the audio signal into a shortcode and the audio signal is matched to the content elements/functionalities using the shortcode.

The at least one of the plurality of content elements may be multimedia.

The content elements may be received periodically over a network connection.

The access may be further dependent on one or more constraints selected from a set of location of the device, time, and history of the user of the device.

The access may be further dependent on receiving a plurality of audio signals.

According to a further aspect of the invention there is provided a system for redeeming vouchers, including:
a first device configured to transmit an audio signal, the audio signal associated with a voucher; and
a second device configured to receive the audio signal, match the audio signal to one of a plurality of unique vouchers, and confirm that the voucher can be redeemed; and
a memory for storing a plurality of unique vouchers, wherein the vouchers are generic vouchers.

The audio signal may include a user identifier unique to the user of the first device.

The first device may receive the audio signal from a third device.

The first device may receive the audio signal from a third device directly over the air interface.

The second device may be further configured to decode the audio signal into a shortcode and the shortcode is used to match the audio signal.

The memory may be located at the second device.

The first device and/or second device may be further configured to check the voucher against one or more constraints before the voucher can be confirmed as redeemed, and wherein the one or more constraints are selected from the set of location of the first device, time, and number of redeemed vouchers.

According to a further aspect of the invention there is provided a system for transferring money, including:
a trusted third party server receives a request for an identifier for a specific monetary value from a mobile device and transmitted the identifier back to the mobile device, receives a request to validate the identifier and effect the transfer of money to the account of the receiving device;
a second trusted third party server receives a request to validate an identifier from the receiving device, communicates with the first trusted third party to validate the identifier, and once validated effects the transfer of money to the account of the receiving device and transmits a validation response back to the receiving device;
a mobile device requests an identifier for a specific monetary value from the first trusted third party server, the identifier is stored on the device, and asynchronously transmitted as audio to the receiving device; and
a receiving device receives the identifier in audio form and transmits the identifier to the second trusted third party server.

The specific monetary value may be usable or reusable within one or more constraints selected from the set of time, location, vendor, purpose, and type of vendor.

The first trusted party server and the second trusted party server may be co-located or the same server.

According to a further aspect of the invention there is provided a method for providing a user interface on a mobile device to manage transmission of data items to a second device, including the steps of:
a) displaying a plurality of data items relating to a user on a display on a mobile device;
b) receiving user input on the mobile device selecting at least one of the data items;
c) displaying, on the mobile device, a plurality of communication options for transmitting the at least one selected data items to the second device, wherein at least one of the communication options includes transmitting the data items as audio from the speaker of the mobile device for receipt by a microphone on the second device;
d) receiving user input selecting at least one of the communication options; and
e) transmitting the at least one selected data items to the other device using the at least one selected communication options.

According to a further aspect of the invention there is provided a system for communicating data, including:
a server, including:
a processor configured to associate a shortcode with data; and
a memory configured to store the association;
an encoder configured to encode the shortcode into a signal in a unique format;
a first device, including:
a speaker; and
a transmitter configured to transmit the signal for inaudible reproduction over the speaker; and
a second device, including:
a microphone; and
a receiver configured to receive an audio signal detected by the microphone;
a decoder configured to decode the audio signal into a shortcode; and
a transceiver configured to access data associated with the shortcode at a server using the shortcode;
wherein the shortcode is globally unique.

The server includes the encoder. Alternatively, the first device includes the encoder According to a further aspect of the invention there is provided a system for transmitting data, including:
a first device, including:
an encoder configured to encode data into a first audio signal; and
a speaker configured to audibly reproduce the first audio signal; and
a second device, including:
a speaker configured to audibly reproduce a second audio signal;
a microphone configured to receive a third audio signal;
a signal processor configured to process the third audio signal to remove the second audio signal; and
a decoder configured to decode the processed third audio signal into data.

According to a further aspect of the invention there is provided a computer program configured for performing the method of any of the above aspects.

According to a further aspect of the invention there is provided a computer-readable medium configured for storing the computer program of the above aspect.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides devices, servers, methods and systems for communicating data.

The inventors have determined that data can be communicated in audio form between co-located devices (devices located close enough to pick up audio transmissions) using speakers and microphones.

The inventors have further determined that it would be desirable for the audio to be audible to human beings to enable individuals to determine when the data is being communicated. For example, it may be desirable in a scenario where one individual is transmitting data from their device to the device of another individual that both are confident that the data is being transmitted.

The inventors have further determined that it would desirable if the audible transmission is audibly unique. That is to say that an individual is able to reasonably able to distinguish the audible signal for one set of data from the audible signal from another set of data.

The inventors also determined that communication of data in accordance with the above specifications results in long transmission times. Therefore, the inventors have devised the use of a reference code or shortcode associated with the data, and the subsequent transmission of the reference code in place of the data.

Accordingly, one aspect of the invention may comprise the association of a shortcode with data, the encoding of the shortcode into a signal in an audibly unique format, and the audible reproduction of the signal. The signal may be detected and decoded back into the shortcode, and the data may be accessed using the association with the shortcode.

Figure 1:
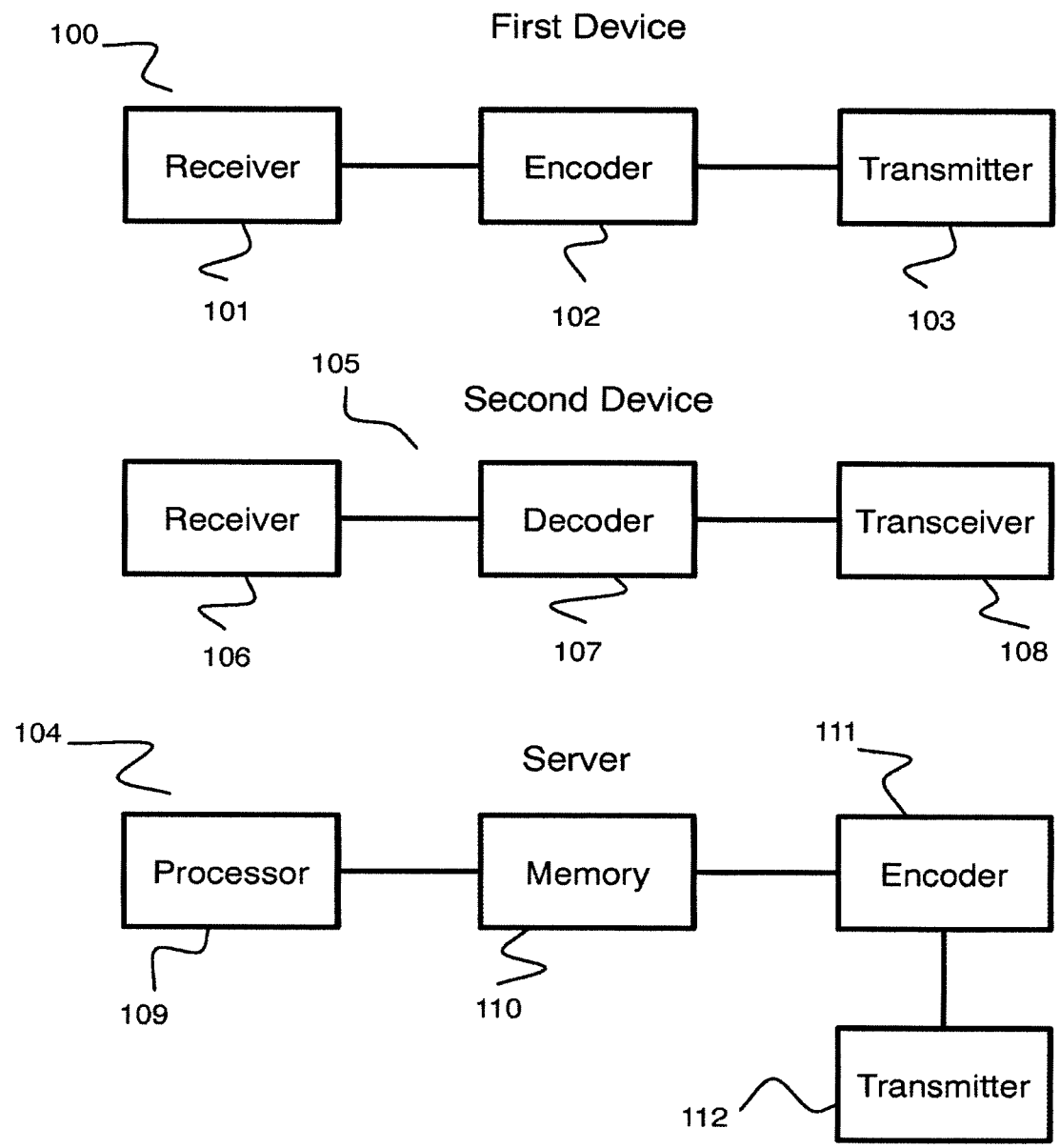
FIG. 1: shows a block diagram illustrating two devices and a server according to embodiments of the invention.
Figure 2:
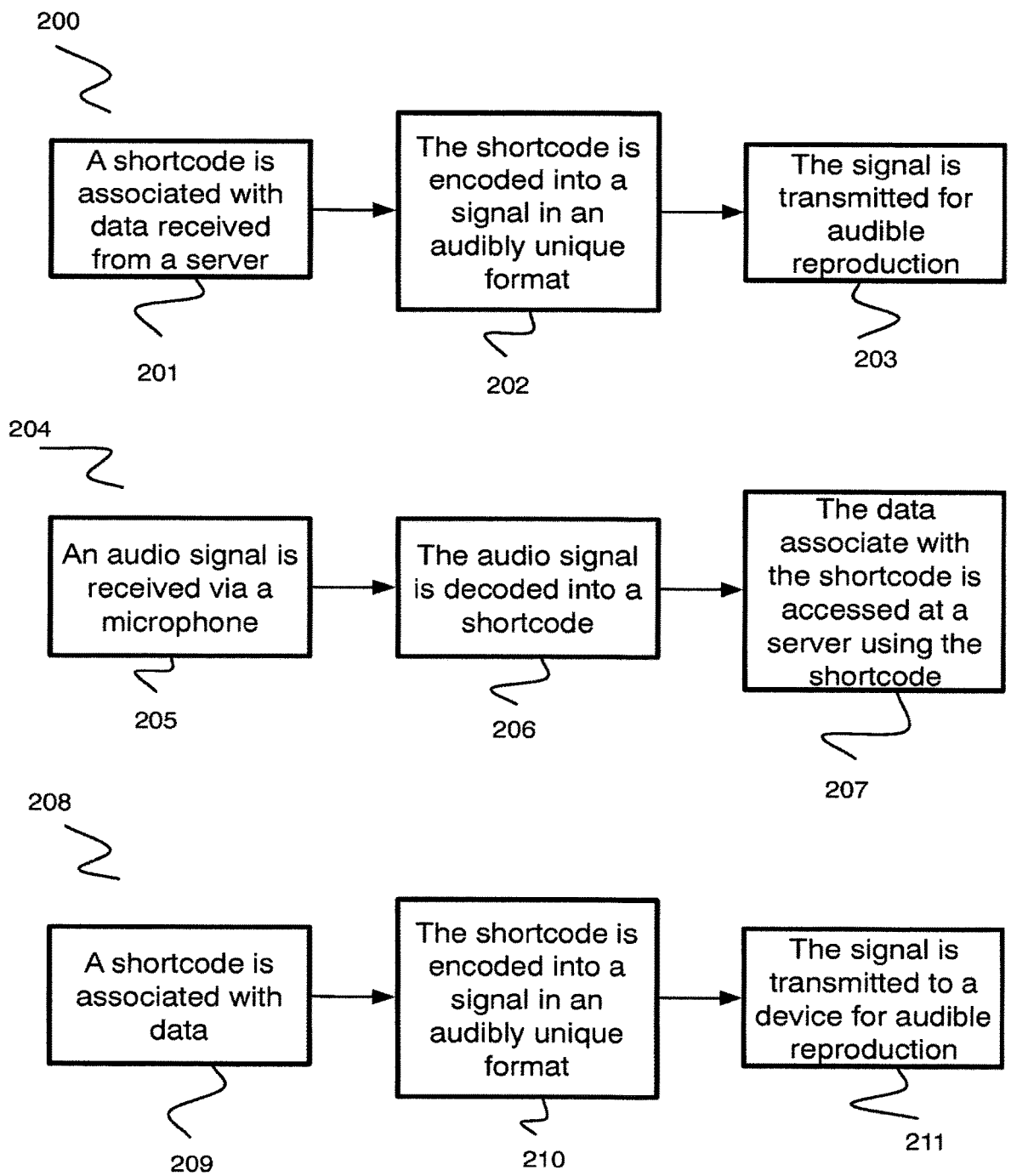
FIG. 2: shows a flow diagram illustrating three methods according to an embodiment of the invention.

Embodiments of the invention in accordance with the above aspect will now be described with reference to FIGS. 1 to 2.

A first device 100 is shown which may comprise a receiver 101, an encoder 102, and a transmitter 103. The device 100 may be a controller within a mobile telecommunications device. The receiver 101 may be configured to receive shortcodes associated with data from a server 104. The receiver 101 may receive the shortcode from a server 104 over a mobile telecommunications network. Alternatively, the device 100 and the server 104 may be controllers within the same device.

The data may be a URL, contact information such as an email address and/or telephone number and/or contact name, a document, account information, a voucher, a token such as a financial token, or any other type of data.

The encoder 102 may be configured to encode the shortcode into a signal in an audibly unique format. The audibly unique format may include at least some birdsong and/or music. The music may utilise western musical tones of equal temperament or it may use microtones. The audibly unique format may include audio which solely improves the aesthetic or distinctive nature of an audible reproduction of the signal and does not relate to the shortcode. In a preferred embodiment, the encoder 102 converts the shortcode into the signal such that at least part of the shortcode data itself is structured into a birdsong and/or musical format. In addition, the signal may include other elements not derived from the shortcode to improve the audible uniqueness of the signal, and/or to improve the pleasing sound of the audible reproduction of the signal.

The shortcodes may be globally unique, that is each shortcode may only have one association to data. Therefore, the location of the server 104 does not need to be embedded within the shortcode. Thus the length of the shortcode may not need to be increased.

The shortcode may include an application header. The header may be added by the server 104 or by the device 100. The header is preferably detectable within the shortcode without the use of the server 104.

Preferably the shortcodes are of fixed length. Alternatively, the encoding process includes the length of the shortcode within the signal.

The transmitter 103 may be configured to transmit the signal for audible reproduction. Preferably, the transmitter 103 may transmit the signal to a speaker for audible reproduction or, alternatively, it may convey the signal over a communications protocol for later audible reproduction.

In an alternative embodiment, the first device 100 may also comprise a memory configured to store the shortcode. In this embodiment the device 100 may later retrieve this shortcode to encode it for audible reproduction.

In one embodiment, the first device 100 may also comprise a user input device configured to enable a user to determine what data is to be associated with the shortcode. The first device 100 may, then, also include a transceiver for communicating this association to the server 104.

A second device 105 is also shown. The second device 105 may comprise a receiver 106, a decoder 107, and a transceiver 108. The receiver 106 is configured to receive an audio signal from a microphone. In one embodiment, the audio signal is that transmitted by the first device 100. Alternatively, the audio signal may be transmitted from a speaker within another device, such as a television, a computer, or a relay which pre-stores the audio signal on a memory. The decoder 107 is configured to decode the audio signal into a shortcode. The transceiver 108 is configured to communicate with a server 104 to access data associated with the shortcode by using the shortcode. In an alternative embodiment, the second device 105 and the server 104 may reside within a further device, and the audio signal may be conveyed through a third device.

In one embodiment, accessing the data involves retrieving the data to the second device 105.

In one embodiment, the second device 105 may further comprise a visual display configured to display the received shortcode or a representation of the audio signal, such as an audio spectrum.

A server 104 is also shown. The server 104 may comprise a processor 109, a memory 110, an encoder 111, and a transmitter 112. The processor 109 may be configured to associate a shortcode with data. The memory 110 may be configured to store the association. The encoder 111 may be configured to encode the shortcode into a signal in audibly unique format. The transmitter 112 may be configured to transmit the signal to the first device 100 for audible reproduction. In one embodiment, the first device 100 does not require an encoder 102 when the server comprises an encoder 111.

In one embodiment, the transmitter 112 may be configured to transmit the signal over a telecommunications network, such as a mobile network. The signal may be transmitted over the SMS-channel or MMS-channel, for example, as a ringtone. The signal may be transmitted as USSD (unstructured supplementary service data).

The server 104 may further comprise a receiver to receive an audio signal from a requesting device, a decoder configured to decode an audio signal into a shortcode, and a processor configured to access the data using the shortcode. Accessing the data may include transmitting the data to the requesting device.

Methods in accordance with embodiments of the invention will now be described.

In one method 200, in step 201, a shortcode associated with data is received from a server. In step 202, the shortcode is encoded into a signal in an audibly unique format. In step 203, the signal is transmitted for audible reproduction. The shortcode is globally unique in that it does not have more than one association with data. This method may be performed on a single device, such as a mobile device.

In a further method 204, in step 205, an audio signal is received via a microphone. In step 206, the audio signal is decoded into a shortcode. In step 207, the data associated with the shortcode is accessed at a server using the shortcode. This method may be performed on a single device, such as a mobile device.

In a yet further method 208, in step 209, a shortcode is associated with data. In step 210, the shortcode is encoded into a signal in an audibly unique format. In step 211, the signal is transmitted to a device for audible reproduction. This method may be performed on a server, such as a server interfaced with a mobile telecommunications network.

It will be appreciated by a person skilled in the art that all or at least part of the methods may be implemented within one or more computer programs. For example, the methods 200, 204 for mobile telecommunications devices could be created as computer program code within an iPhone app, within an Android app, within Symbian, or within any other programming language. The method 208 for the server may be created in any computer programming language, system, or framework such as Python/Django, PHP, Python, Ruby on RAILS, or any other system.

An embodiment of the invention will now be described with reference to FIGS. 3 and 4. This embodiment of the invention will be referred to as Chirp.

Chirp comprises a protocol and set of applications that support peer to peer and online sharing using audio encoding small amounts of data. In this embodiment, peer to peer means devices that are physically co-located, usually mobile phones/devices; online means through social networks or standard web services; small amounts of data means approximately 32 to 1024 bits; and audio means audible sound that is pleasant to the ear, such as music.

In an alternative embodiment, the audio is inaudible. Speakers within current mobile devices can transmit audio up to 20 kHz which is above the hearing range of nearly all human beings. Microphones within some current mobile devices can receive audio up to 22 kHz. The range of audio above 18 kHz is inaudible to most adult human beings. Therefore, the audio can be transmitted at mostly inaudible frequencies by most mobile devices or specialist speakers, and can be received at inaudible frequencies by most mobile devices. Audible audio may be advantageous in that users can audibly confirm data transmission, the audible audio establishes product recognition, novelty value to users, and certain data transmissions may have recognisable audible audio to enable the user to partially verify what is being transmitted. Inaudible audio may be advantageous in that the audio does not need to be pleasant and thus greater data compression may be able to be used.

In a typical use case two devices are situated near to each other, and one person will "Chirp" a short piece of data to another. The sending device generates audio, and the receiving device receives and decodes the audio. This audio will be audible to the two users so that they will know the data exchange has taken place. The data transferred will be a short string, which will be either an application-specific code, or a shortcode generated by a web service, or will be some another form of code generated.

This specific point to point transfer of audio can be embedded in many different larger-scale interactions. In particular, because the data transfer is effected over audio, any device capable of transmitting audio could play a Chirp. Further, any device capable of recording audio, could record a Chirp for later playback. Any webpage could thus play Chirp, and any applet on a webpage such as a Flash or Java applet which has access to the microphone can receive Chirps. Chirps can be conveyed over any communications network or system which can then audibly reproduce the Chirp, for example, radio, or TV networks.

Basic Protocol

Protocol Stack

There are three parts to the protocol that describes how data is transferred:

Semantic Coding—the encoding 300 (Es) and decoding 301 (Ds) of short codes to application specific meaning.

Data Coding—the encoding 302 (Ed) and decoding 303 (Dd) of short codes to a music description format.

Transfer Coding—the encoding 304 (Et) and decoding 305 (Dt) of the music description to sound waves 306.

Figure 3:
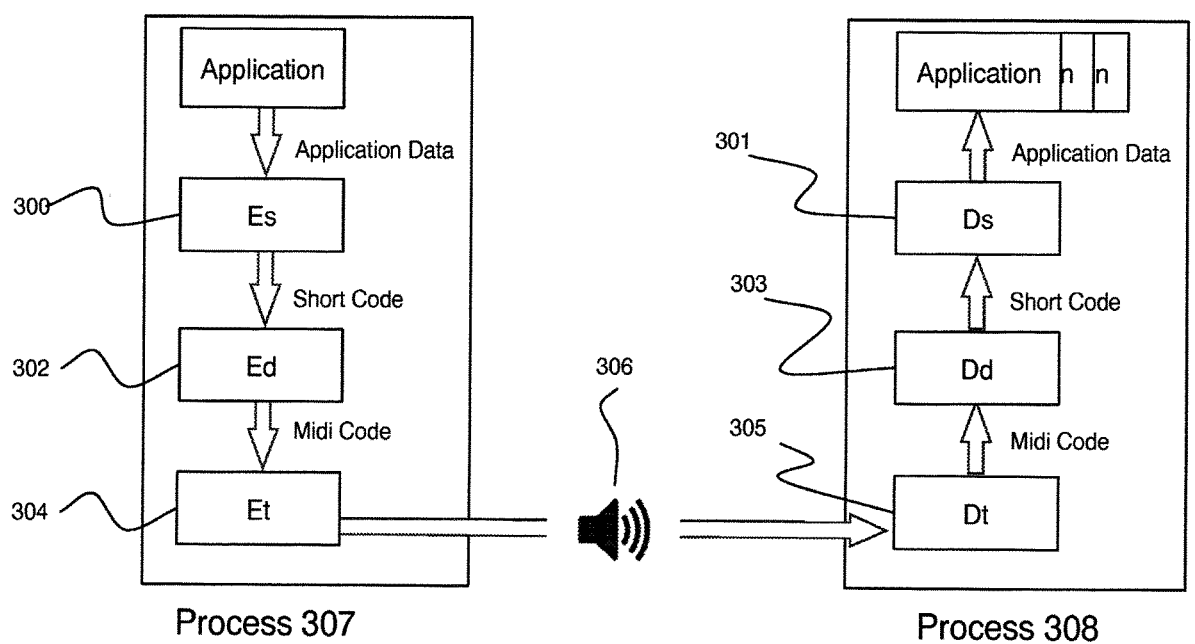
FIG. 3: shows a block diagram of a protocol stack according to an embodiment of the invention.

The protocol is illustrated in FIG. 3.

An application on Process 307, requests a chirp and hands to the encoding process Es, application data. Es might thus be considered a function:

$$Es:(A,B) \rightarrow C$$

Where A is an application identifier as a string, B is application data as a string and C is an output string. The function Es might be implemented locally on Process 307 or, preferably, it might make use of a web service. The string A would typically be drawn from a small sample of applications (e.g. it might be a URL, and thus the symbol A might be "URL"). The string B is of arbitrary length. The shortcode C will be of a fixed length between 32 and 1024 bits. The fixed length will be specified depending on implementation.

This shortcode is then encoded into a music description language by the encoding process Ed which can considered to be a function:

$$Ed:(C) \rightarrow D$$

D is a sequence of codes in a music description language (MDL). One example of an MDL is MIDI, and the code could be a sequence of MIDI codes. In one embodiment the values may be just pitch values or, in an alternative, other audible parameters including note volume or dynamic amplitude changes, note-length, timbral properties, and the continuous modulation of such parameters where available. Thus the shortcode C may be represented as a string of ASCII characters and the "music code" D may be a sequence of MIDI control codes. One advantage of using MIDI is that MIDI playing is a capability that is available, or can be made available, on most platforms. Alternatively, a device-specific ringtone format could be used.

Because the decoding process may imprecise due to interference in the audio process (discussed below), Ed may use a redundant coding scheme such as Reed-Solomon codes.

The final step of encoding is to encode D into sound waves. This is in effect, a MDL player.

$$Et:(D) \rightarrow E$$

E can be any audio format, such as WAV. It will be appreciated that alternative audio formats, such as MP3 or MP4 or AIFF, could also be used.

If MIDI is used a voice set may be selected (i.e. which audio samples are actually played or synthesized). The voice set and pitch range may be selected to produce a signal E which fulfils certain requirements of audio transmission and reception, such as ease of reproduction (for example, low frequencies are not well reproduced on mobile devices which typically feature small, low-powered speakers), and ease of detection for decoding purposes.

The first step in the decoding process 308 is the decoding of sound into MDL (e.g. MIDI) codes.

$$Dt:(E') \rightarrow D'$$

E' indicates that the audio may have additional noise and may include background noise when it is decoded, and thus D' will be a sequence of MDL (e.g. MIDI) codes that may not be the same as D. This Dt process may also include a pitch detection system.

The next step is to decode this MIDI sequence to a shortcode, realized by the function Dd. Because the encoding step used redundant codes, the decoding process will, with high probability, return the original shortcode C.

$$Dd:(D') \rightarrow C$$

The final process is to decode the short code.

$$Ds:(C) \rightarrow A,B$$

The short code will identify the application A, and the application data B. As before, with Es, this decoding might be done locally in the application, or it might be performed with the help of a web service.

An analogy might be made to the TCP/IP protocol stack. In particular, the different layers of the protocol might be realised in different ways. The "generic" layer (the equivalent of IP in the TCP/IP stack) is the shortcode. As with TCP/IP, the specific encoding to a transmission media, can be realized in other types of coding. For example, QR codes.

Reliability in the transmission may be driven by two aspects of the audio: the reliability of the audio decoding, that is the pitching tracking in function Dt, and the redundancy of the encoding in Es and Ds. In relation to Ds, different audio characteristics might be used, such as frequency modulation, or PCM coding. The different types of audio characteristics to be selected may be balanced against the ease of the encoding step (Ed, Et), for example, when this step is performed on very low cost hardware or in embedded web applets.

The steps Es and Ds, can be flexible. It is this layer that might be made semi-open, in the sense that for arbitrary applications to interact, they may need to agree on the semantics of message. Typically, e.g. in IP, there is a short header that, amongst other things, describes the "higher-level" protocol that is used. Because the Chirp protocol is a point to point protocol (albeit that there may be multiple listeners, see below), the application can be identified as a single header byte. Certain values of this byte would be reserved to indicate particular applications (e.g. 0x01 as URL, or 0x02 as coded ISBN). This may then enable the decoding process to determine which application should handle the remaining 7 bytes (given a 64 bit code) or 127 bytes (given a 1024 bit code).

In one embodiment, the length of the shortcode is encoded in the shortcode itself. However, one possible disadvantage of this is that decoding audio (Dt) needs to handle unknown shortcode lengths (i.e. unknown numbers of notes to detect). The choice of whether to encode the length of the shortcode may be dependent on the intended use—for sharing large amounts of data in a pure peer to peer manner or whether web services are utilised for larger data and pass identifiers.

Music Encoding

One embodiment of music encoding will be described. Assuming the shortcode is 64 bits, this could be split into 4 bit chunks, which would result in an "alphabet" of 16 notes. 16 distinct frequencies can be chosen algorithmically, or (just under) two octaves of a key could be used so that the notes in the tune are in key. 16 distinct notes would result in a signal or "Chirp" of 16 notes in length.

Alternatively, more complicated coding schemes, using common note patterns, arpeggios and progressions, could be utilised. All of these may use more notes than a simple random sequence.

For decoding purposes it may be preferable to ensure that the pitch changes from note to note. This could help to avoid ambiguities of decoding note length and phase. Therefore the alphabet may be expanded by at least one symbol.

A URL Sharing Service

A scenario utilising an embodiment of the invention will now be described with reference to FIG. 4.

In this scenario, a URL is to be shared between two users. Alice has a smart phone running Process 400 ("ChirpApp"). Bob has a smart phone running Process 401 ("ChirpApp"). Alice wishes to share a URL with Bob.

Figures 14A, 14B, 14C:
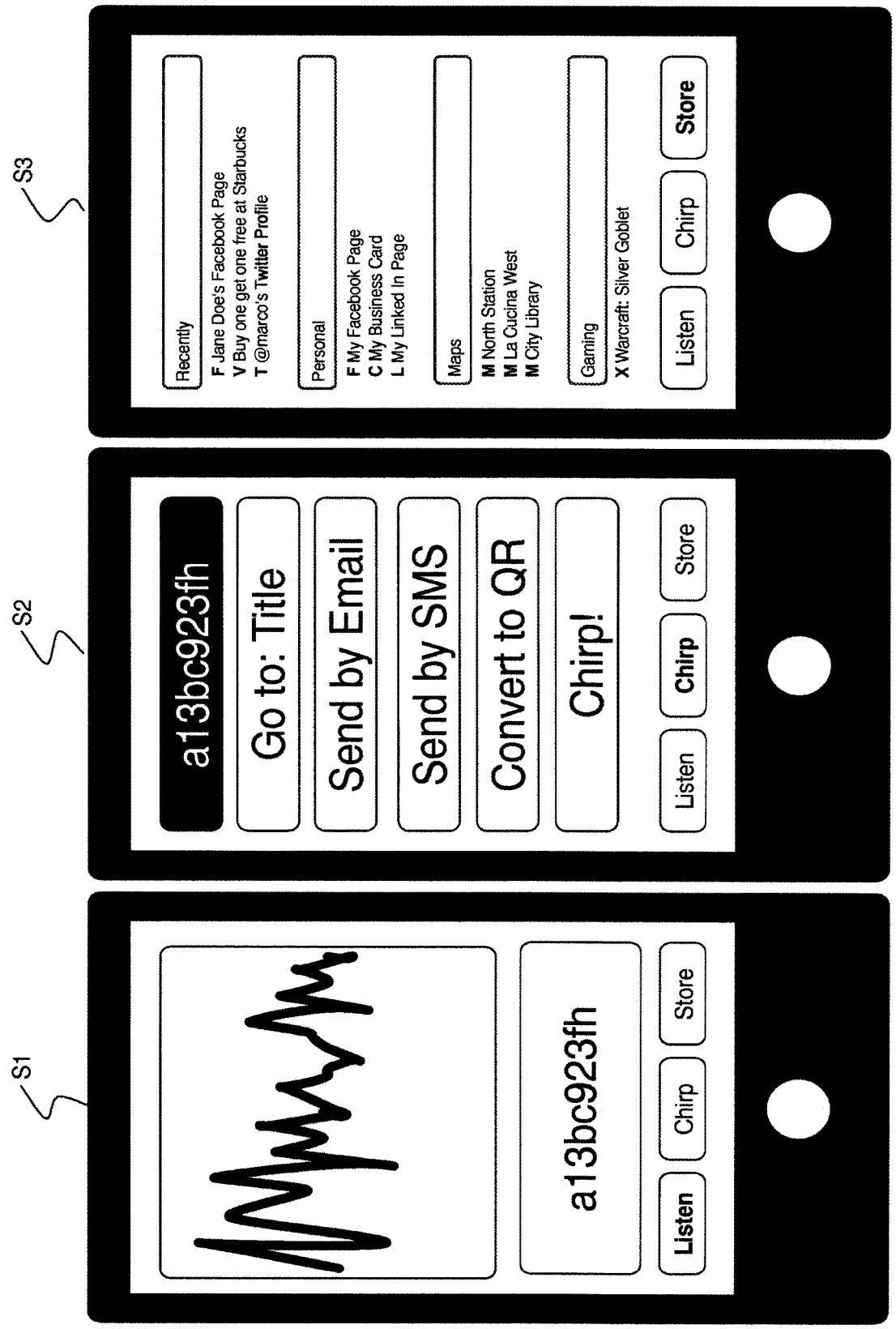
FIGS. 14a, 14b, and 14c: shows screenshots on a mobile device illustrating a user interface according to an embodiment of the invention.

ChirpApp may utilise the user interface described in FIGS. 14a, 14b, and 14c. In an alternative embodiment, the Processes 400 and 401 may be integrated into different applications and/or applications that are not dedicated to transmitting data in audio (e.g. the Processes 400, 401 may be integrated into a Photos application to facilitate sharing of a photo).

Process Overview

Figure 4:
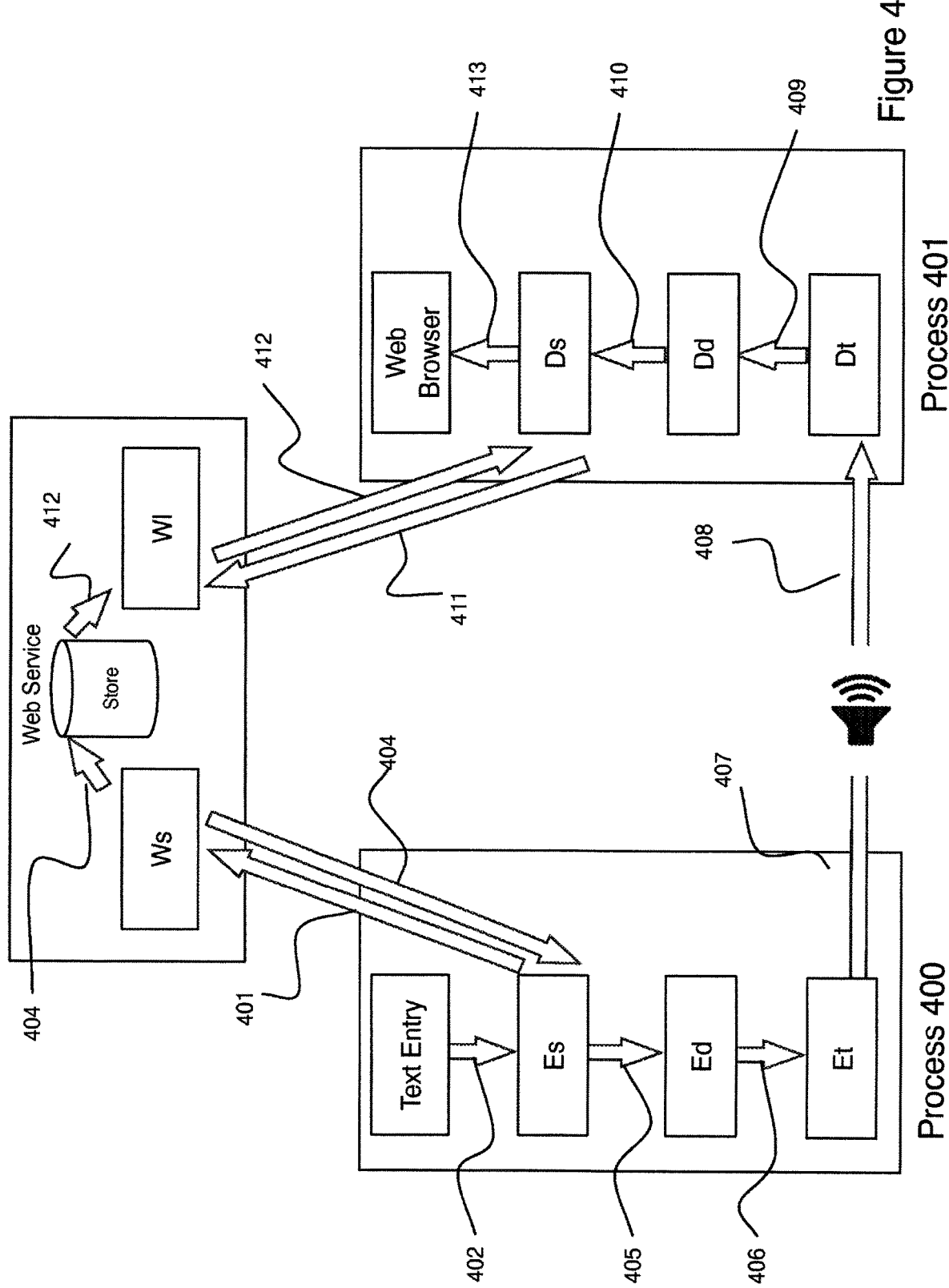
FIG. 4: shows a block diagram illustrating URL sharing according to an embodiment of the invention.

Referring to FIG. 4, the steps are as follows:

402—Alice pastes text into an application ("ChirpApp"), which is passed to the Es process (for example, the URL may be "www.bbc.co.uk").

403—The Es process makes a request to a web service called Web Shorten (Ws).

404—Ws returns a text string code for the URL (a "hash code") to Es (e.g. "6xf42d3edfG") and also stores the relation between the hash code and the URL in a database ("Store").

405—Es takes this code and pre-pends it with the application code for web url (e.g. 0x01) and passes it to Ed.

406—Ed converts this into a music code.

407—The music is played.

408—Process 401 receives the audio.

409—It is decoded to a music code and passed to the Dd.

410—Dd decode it to a shortcode and passes it to Ds

411—Ds removes the 0x01, and then sends the hash code to a web service called Web Lengthen (Wl).

412—Wl looks up the hash code in the Store and returns the corresponding long URL (e.g. www.bbc.co.uk) to Ds.

413—Ds hands the URL to a web browser window to open.

In this embodiment, Es, and Ds each utilise a remote procedure look up a table. The Web Service is a web service with multiple entry points: Ws and Wl in this scenario. Both these services require access to a Store which contains a table that maps hash-codes to URLs. Each hash code maps to a unique URL. This is because the shortcodes that are generated are transmitted from peer to peer. It also means that Es cannot itself generate the shortcode directly from the URL.

The hash codes may be index values to the table of a predetermined length.

The code length necessary for this system may be quite short. For comparison, a bit.ly URL is 6 characters from a base-62 alphabet (a-z, A-Z, 0-9). This results in almost 30 bits of information. To ensure encoding a larger space, at least 64 bit codes will be used.

In one embodiment the encoding is built in to the web browser of Alice's smart phone. In one embodiment the ChirpApp includes a multimedia display (e.g. it is a Twitter client).

In an alternative embodiment, in step 402, Alice may be able to store multiple URLs but receive only one code from the web service.

In an alternative embodiment, an application on the user device could give permission to encode as Chirps the user's last ten favourites, recently visited locations on FourSquare or recently mentioned Twitter contacts. This information may be harvested from that application by ChirpApp.

In one embodiment, in step 406 Ed may encode the shortcode into the following format:

Front door sound+encoded shortcode+end of chirp where the front door sound is a predefined sound to enable receivers (in step 408) to identify the beginning of the transmission, encoded shortcode is the application code and hash code encoded into audio, and end of chirp is a predefined sound defining the end of transmission. The advantage of defining beginning and ending sounds is to assist the receiver. The format may also include the addition of a further chirp sound to indicate that a next chirp is also going to be transmitted. In such a case, the front door sound may not be necessary. The further chirp sound could be a predefined sound or may indicate how many further chirps are to be expected. The further chirp sound may appear before the end of chirp sound.

The user experience may include running ChirpApp and pasting in data. An alternative is embedding a "Chirp Button" in the application (i.e. the web browser). Once this is pressed the shortcode would be generated by querying a web service, and then within, approximately 1 to 2 seconds audio will appear. In one embodiment, Bob needs to run his instance of ChirpApp before the audio starts. Alternatively, Bob could record the audio for later decoding. Once the audio starts arriving, a representation of the short code could appear to indicate that the receiving process is working. This may be accompanied by an audio spectrum visualisation to show that audio levels are working.

Once the full audio is received, the short code may be revealed to the user.

URL shortening services, such as bit.ly, typically use 6 characters in base 62 (52 upper and lower case letters plus numerals). One alternative to this is 6 characters in base 36 (no upper case letters). Some services do not guarantee that a shortcode is available for long time use. Thus a URL shortening service should support approximately 36 bits ($\log_2(62)*6=\sim35.72$ or $\log_2(36)*6=\sim31.02$).

If the shortcode is a 6 character string in base 62, this can be represented in 36 bits, or 5 bytes (actually 4.5 bytes).

The input of the function Es is, therefore, 5 bytes. To provide some redundancy the mapping may use an error correcting code, such as a Reed-Solomon (9,5) code, meaning that 9 bytes are output, and there are 4 error correction bytes. Therefore 9 bytes (72 bits) are encoded into MIDI codes. This embodiment will be described using only simple pitch without amplitude or other modulation. The middle of the usable range of MIDI notes is C4 (MIDI note 60) through G6 (MIDI note 91), that is, 32 usable notes. This means 15 notes are used. In one embodiment, one of the notes only encodes 2 bits, and the other 3 bits are reserved. This will be the first MIDI note. This means the first tone would be selected from only one of four values: 60, 68, 76, 84. The subsequent notes may be coded in sequence.

In this particular embodiment, the first note will be played for 160 ms. The second through fifteenth notes are played for 80 ms. Therefore, the total length of the tune will be 1.28 s.

To decode the tune, pitch detection may be used. The encoding in audio is a frequency keying systems. Both FFT and tuned filter bank implementations may be used. One implementation utilises the Goertzel algorithm with 32 target frequencies.

A target tone of length of 160 ms is then searched for. Because the 3 bits of the first code are reserved, any tone in the range can be detected. In this embodiment, only the highest 2 bits of the first MIDI code are taken (i.e. (code—60)/8).

Further decoding proceeds in reverse of the encoding. The 15 MIDI codes are converted to 9 bytes of data, which is decoded through the Reed-Solomon code to a 5 byte sequence. This may be converted to a base 62 string of length 6. If a length 7 string is created, this would be an error, and means the error-correcting code was undetected.

The Reed-Solomon code can correct for erasures. Thus if the filter bank does not detect a peak at any time step, or the peak is ambiguous due to noise, the relevant bytes may be marked as erasures, and they can be corrected.

The inventors have also determined that it would be desirable to enable the transmission of data to or from a user with a device when that user's device is unable to access a server.

Accordingly, one further aspect of the invention may comprise receiving a shortcode from a server, storing the shortcode on a first device, associating the shortcode with data, transmitting the shortcode to a second device, and then transmitting the association between the data and shortcode to the server.

The asynchronous association of data with the shortcode may enable transmission between two devices of a mere "reference" to the data without requiring either device to be "online" or with access to a server with information as to the association between the shortcode and the data. Therefore, it may enable asynchronous access to the data by the second device by use of the reference or shortcode.

Figure 5:
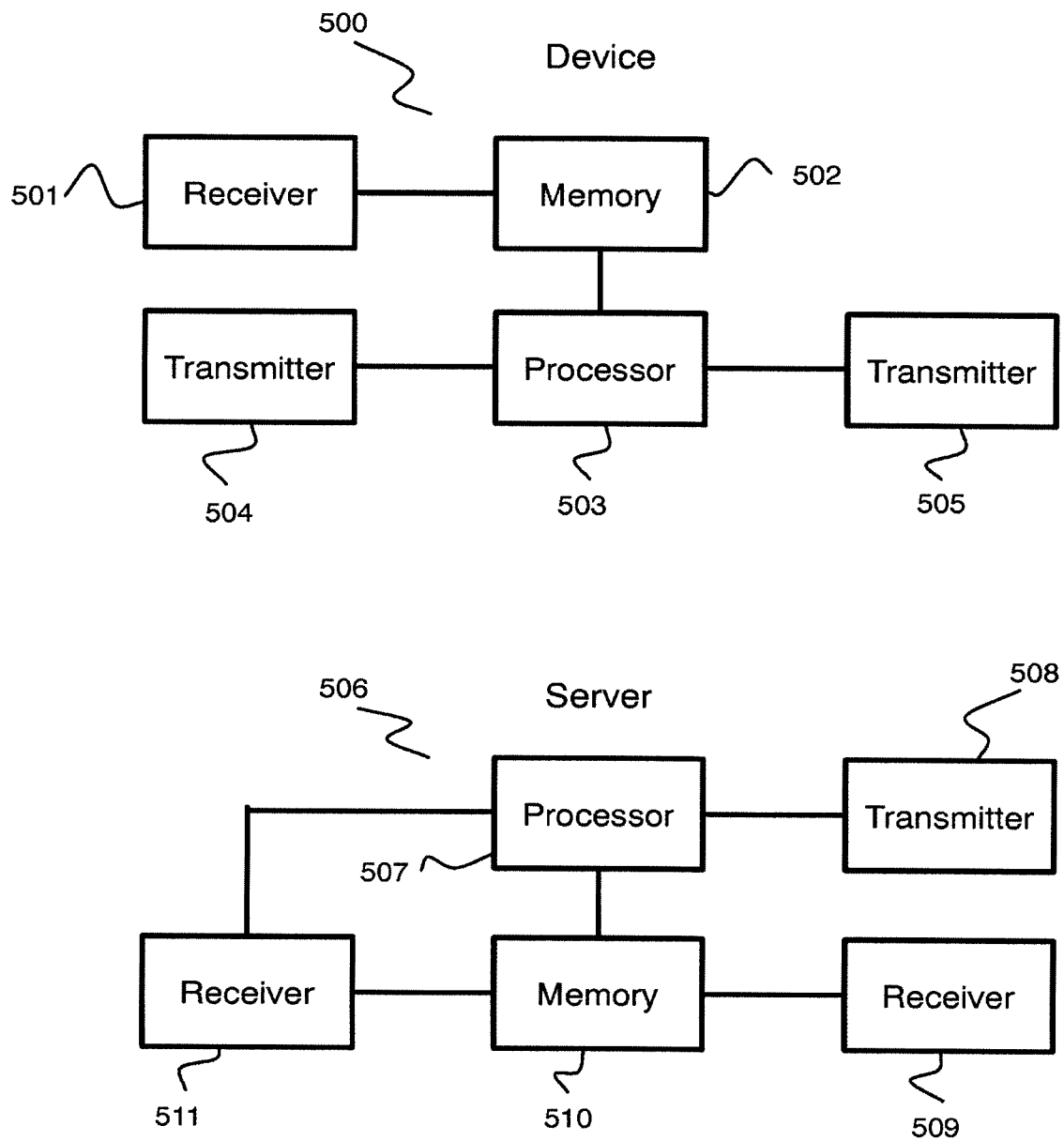
FIG. 5: shows a block diagram illustrating a further device and a further server according to embodiments of the invention.
Figure 6:
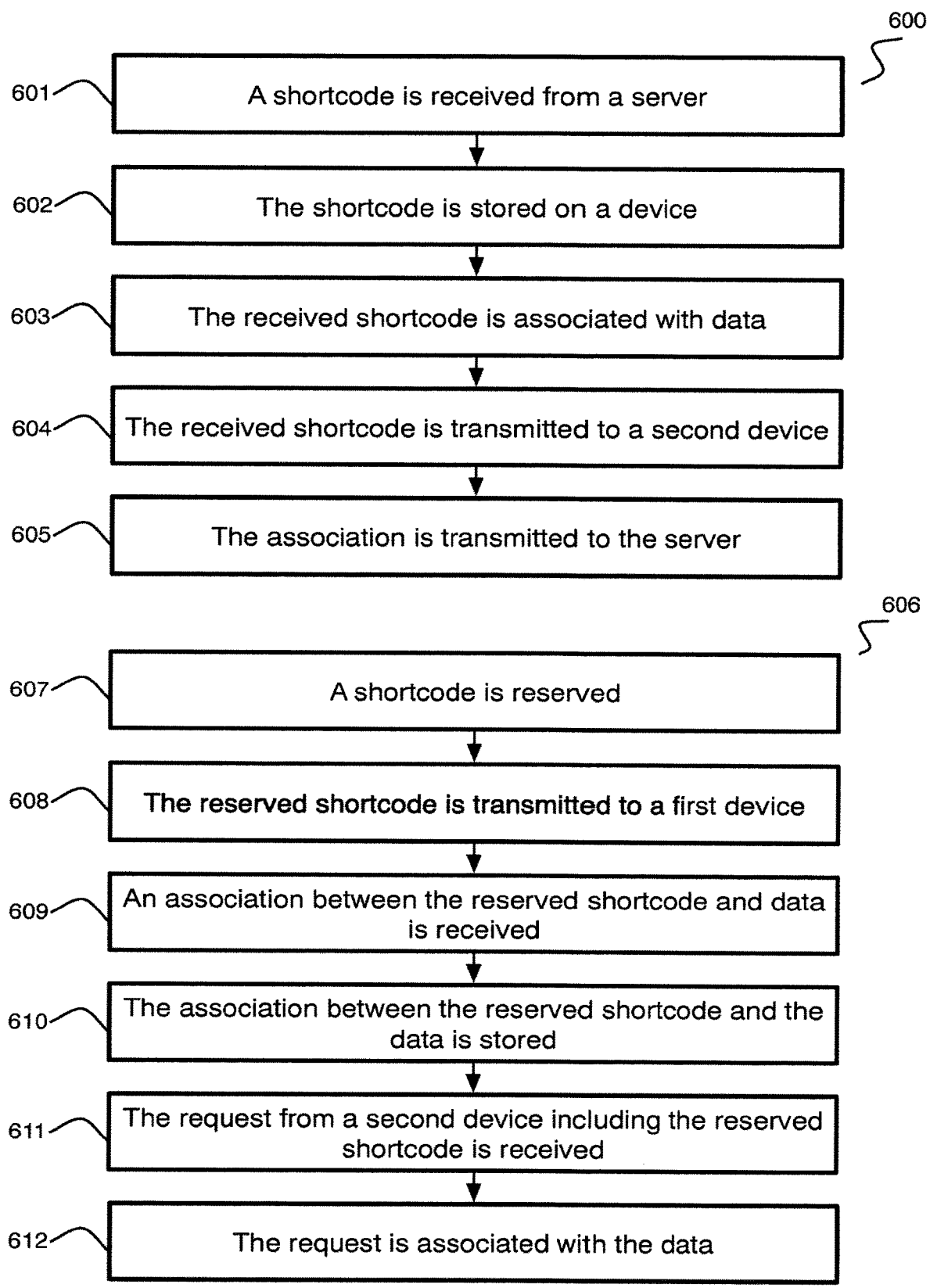
FIG. 6: shows a flow diagram illustrating two methods according to embodiments of the invention.

Embodiments of the invention in accordance with the above aspect will now be described with reference to FIGS. 5 to 6.

A device 500 is shown. The device 500 may comprise a receiver 501, a memory 502, a processor 503, a first transmitter 504 and a second transmitter 505.

The receiver 501 may be configured to receive a shortcode from a server 506. The server 506 is preferably accessible via a communications network such as a mobile telecommunications network or the Internet. In an alternative embodiment, the server 506 and device 500 reside within a further device such as a mobile communications device.

The memory 502 may be configured to store the received shortcode. The memory 502 may be flash memory or may be memory integrated within the processor 503.

The processor 503 may be configured to associate the received shortcode with data. The processor 503 may receive input to associate the data from a user via a user input device. The input may be the data itself.

The first transmitter 504 may be configured to transmit the shortcode to a second device. The first transmitter 504 may transmit the shortcode using a direct interface (an interface directly between both devices such as an audible channel, Bluetooth, visual display and detection, IR, NFC, wireless, or RF).

The second transmitter 505 may be configured to transmit the association between the shortcode and the data to the server 506. Preferably, the second transmitter 505 uses the same communications system as the receiver 501.

A server 506 is also shown. The server 506 may comprise a processor 507, a transmitter 508, a first receiver 509, a memory 510, and a second receiver 511.

The processor 507 may be configured to reserve a shortcode in the memory 510. The server 506 may reserve the shortcode in response to a request from a user on a device, such as the device 500 shown. The shortcode may be allocated by the server 506 or, in an alternative embodiment, may be specified by the user within the request.

The transmitter 508 may be configured to transmit the reserved shortcode to the device, such as the device 500 shown.

The first receiver 509 may be configured to receive an association between the reserved shortcode and data. The association may be received from the device.

The memory 510 may be configured to store the association between the reserved shortcode and the data. The memory 510 may be volatile memory, such as RAM, where the server remains online continuously, or non-volatile memory, or on both for redundancy.

The second receiver 511 may be configured to receive a request from a second device. The request may include the shortcode. The processor 507 may be configured to associate the request with the data. The processor 507 may use the shortcode to retrieve the association with the data. The processor 507 may further process the data in accordance with the request.

Further methods in accordance with embodiments of the invention will now be described.

In one method 600, in step 601 a shortcode is received from a server. In step 602, the received shortcode is stored on a device. In step 603, the received shortcode is associated with data. In step 604, the received shortcode is transmitted to a second device. In step 605, the association is transmitted to the server. The method may be performed on a mobile telecommunications device.

In another method 606, in step 607 a shortcode is reserved. In step 608, the reserved shortcode is transmitted to a first device. In step 609, an association between the reserved shortcode and data is received. In step 610, the association between the reserved shortcode and the data is stored. In step 611, a request from a second device is received. The request may include the reserved shortcode. In step 612, the request is associated with the data. The method may be performed on a server.

It will be appreciated by a person skilled in the art that all or at least part of the methods may be implemented within one or more computer programs. For example, the method 600 for mobile telecommunications device could be created as computer program code within an iPhone app, within an Android app, within Symbian, or within any other programming language. The method 606 for the server may be created in any computer programming language, system, or framework such as Python/Django, PHP, Python, Ruby on RAILS, or any other system.

Asynchronous URL Sharing Service

An embodiment of the invention will now be described with particular reference to FIG. 7.

In this particular scenario, Alice wants to share a URL with Bob, but one or both of them is not online.

Process Overview

Figure 7:
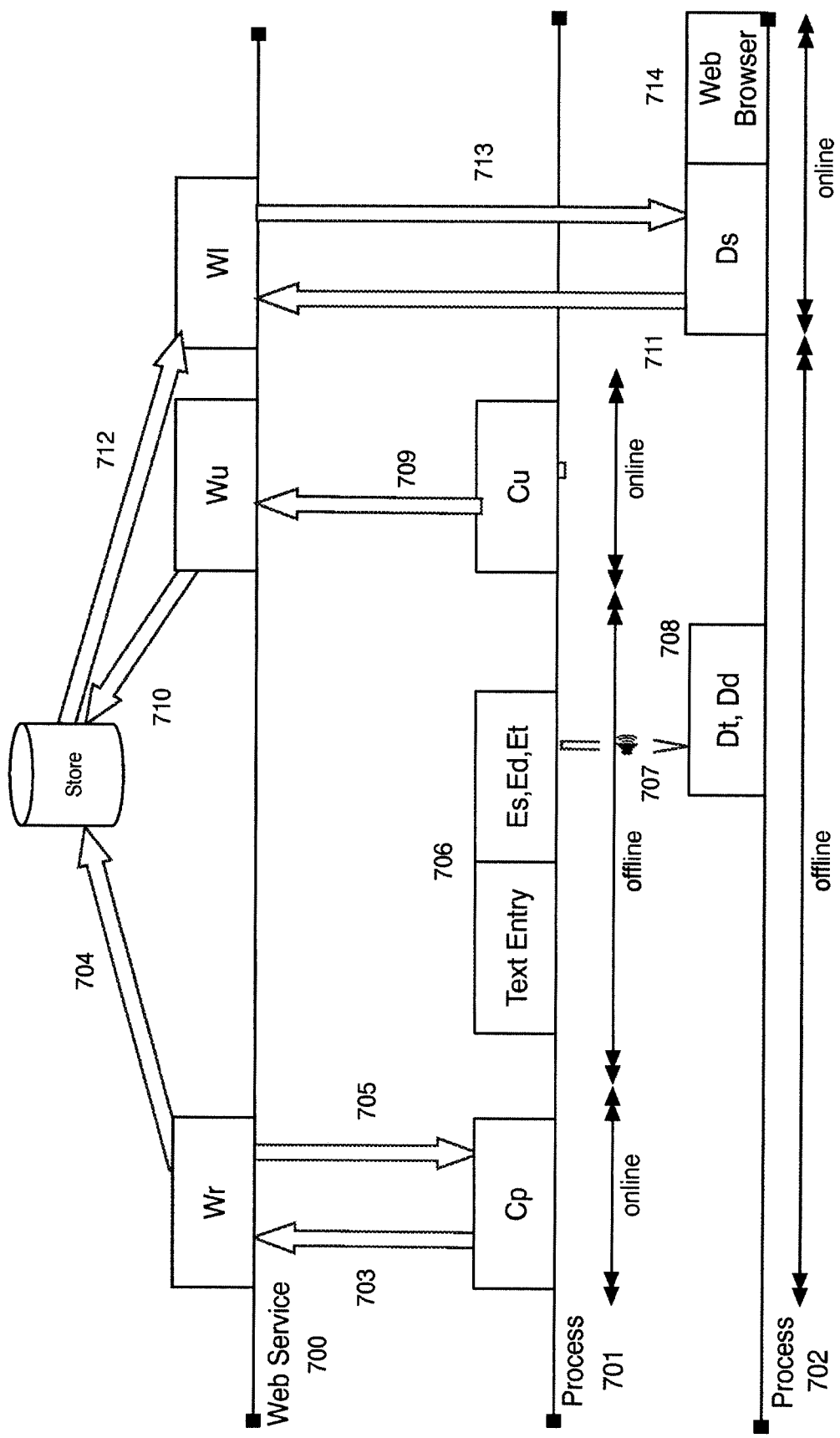
FIG. 7: shows a block diagram illustrating asynchronous URL sharing according to an embodiment of the invention.

Referring to FIG. 7, the process is shown in the following timeline, which shows three processes—a web server process 700, Alice's application process 701, and Bob's application process 702. Time progresses from left to right.

703—When the Process 701 ("ChirpApp") on Alice's device, is online a function Cache Pre-cache (Cp) makes a request to a web service 700 called Web Reserve, to reserve a set of hash codes.

704—These codes are stored in Store, and are not yet mapped to a URL.

705—Wr returns the code to Cp, which stores it locally for future use.

706—When Alice now tries to Chirp a URL, Alice's device is offline. However, one of the pre-cached hash codes can be used. Thus the encoding processes Es uses one of these pre-cached codes and can generate the short code, music code and generate audio.

707—The Chirp is transmitted

708—Bob's device running Process 702 ("ChirpApp") receives the Chirp, but it is also offline. It cannot decode the Chirp beyond the stages Dt, Dd. Even if it were online, it would not be able to decode the short code, because the webservice W1 would at this time find a blank URL next to the reserved code.

709—When Process 701 goes online, a function Cache Updater (Cu) relays the new relation between a hash code and URL.

710—The web service Web Updater (Wu), stores this new relation in the Store. Any process can now look up the URL from the hash code.

711—When Process 702 goes online, it attempts to fetch all un-decoded short codes. It passes the hash code to Wl as before.

712—Wl looks up the now non-blank mapping from short code to URL

713—Wl returns the URL to Ds

714—Process 702 starts a web browser.

Preferably the process uses a user account, to prevent Wu being updated by anyone else. It may be a paid service.

There is now a period when a Chirp cannot be fully decoded (i.e. before Alice uploads the relation between the hash code and the URL to the web service). However, at step 708, Alice and Bob can confirm that the short code has been transmitted: in one embodiment the user interface on each of their devices can show them the shortcode to compare, and/or the user interface can allow Bob to "replay" the Chirp, and both users can listen to confirm that the two sounds are the same. If the sounds are the same, then in principle, the data can be successfully looked up. The ChirpApp may let Bob know when Chirps can be fully decoded. It is not possible once Bob is online, then Alice has not been online to undertake step 709 yet. At this point Chirps may be identified as "pending update from the original sender". Therefore Chirps may be spread virally to be decoded at a later date (e.g. link to a film trailer clip released at a particular time).

In this particular embodiment, the functionality of both processes are comprised within a single application that is deployed on both devices—ChirpApp. This application may be the same application as described in relation to FIGS. 3 and 4. It will be appreciated that the processes may also be comprised within separate applications.

Further embodiments of the invention will now be described.

Dumb Relays

There are several possible implementations for dumb relays, that is, processes that cannot decode, but simply record and transmit raw audio, or music descriptions.

The encoding and decoding steps may themselves be provided as web services. The web services might offer downloadable Chirps as MP3s, or support playing of Chirps in a web browser. This means that a web browser can generate a Chirp immediately if there are speakers attached.

In addition, these services can be exposed through other gateways such as MMS.

As previously noted, the Chirp itself is audio, so it may be recorded and relayed by any type of device that supports these functions. This includes plain telephones (land-lines) and non-smart phones.

The Chirp may also be stored in a digital media or it can also be stored in analogue media such as on tape, vinyl, or video tape. The ability to record Chirps to both analogue and digital media means it may be mixed in to other media for broadcast over big dumb relays such as television. For example, a television advertisement could include a Chirp audio track.

Reserved Code Service

Some of the music codes generated may sound like well known tunes. Given that Ed and Dd are reversible functions, versions of these tunes can be made in an MDL, such as MIDI, the corresponding short codes can then be found and reserved. This could be a paid service. This process would work well for capturing signature tunes (Windows Start-Up, Intel jingle, etc.), and making them redirect to specific web services.

Strict Peer to Peer Model

One model is to embed Chirping into a standalone application. Then short codes can have application specific semantics. For example, in an application that shared vouchers; the voucher itself could be embedded as an image in the application downloaded to the mobile device. The voucher would be unlocked when a specific Chirp was heard by the device, but the code is there just to activate the voucher in the application. Once a Chirp was heard by a device, that device would then be able to relay the Chirp on.

This would permit viral sharing of vouchers or coupons. In addition, the number of hands through which the voucher has spread could be encoded, and this could be rewarded appropriately, and possibly also the number of times the voucher has been handed off to someone else. To do this, the shortcode might not match one voucher, but there is a code generation loop, which can generate the next shortcode, and thus Chirp audio, in a known sequence. The receiving application would thus not only be able to tell which shortcode, but something about the history of it. This could enable a type of voucher code that vests only after a certain number of people have it.

Another concept would be to virally share other media types such as parts of a new band video, or trailer for a video. Such that a user would get a random part of the media when the application is downloaded, but that the user and a friend could collect the other's part of the media by exchanging Chirp codes. This would quickly allow a group of friends to assemble the video or audio track collectively, and facilitates interaction around the media.

Remote Steering Example

An example based on a conversation with embedded Chirps as signals to equipment nearby the listener (e.g. a PC running a web version of ChirpApp).

This will allow, e.g. a call centre operative to remote control the local PC, by forcing it to move to certain pages.

One way to implement this is to embed the Chirp reader into a Flash applet on a web page. Flash has access to a microphone, so can "listen" for Chirps in the local environments, such as output from a TV or speaker phone. Thus a remote operator could, whilst talking, send Chirps which would be heard by the applet on the web page. The applet could then steer the web page, by changing page, animating, etc. It could possibly even carry secure codes to activate certain areas of the web site that might otherwise be restricted. A potential use would be in technical support for PCs.

Reliable Peer to Peer and Secure Peer to Peer

As currently explained, Chirp may be used for one way transfer of data. As discussed, a Chirp could be broadcast on a non-interactive medium such as broadcast TV. However, with smart phones and other platforms, the sender will almost certainly be able to act as a receiver.

If the sender and receiver are both capable of sending and receiving, multiple-stage protocols can be implemented. For example, the two devices could handshake by sending identity information (e.g. a code and Chirp representing "Hello, I am device X" causing the response "Hello X, I am device Y"). Device X could then send a message with "Y, have Chirp Z", which could be acknowledged with "X, Y received Chirp Z". This may make Chirp transfer more reliable. Device X can detect that Device Y received the Chirp correctly because it gets back a copy of Z, and if it is distorted somehow, Device X can resend. It can also resend if it hears nothing within a certain time period, assuming that the device either didn't hear, or isn't able to reply. In any case, it is important to realize that the users of the Devices may be able to listen for the Chirps, and may be able to understand whether data has been resent, or needs resending; they can intervene if necessary.

Further to the above, it is possible to encode the Chirp Z using public/private key exchange. The Devices exchange public keys $K_{PX}$ and $K_{PY}$, rather than simple identifiers. The Chirp can then be encoded with the private key of $K_{PrX}$, to create an encrypted Chirp Z'. Device Y can then know both that the contents are secure, and the sender is authentically X.

For all peer to peer systems, there may be an audit trail on the web service, so that transactions can be logged. In particular public keys might be stored on the web service.

Chirp and Pin

One extension to peer to peer services is to facilitate interaction with external services, such as payment services. Payment services require the exchange of some form of token, and a Chirp could be that token. This could work in at least three different ways.

First, the Chirps themselves could be "valuable" in the sense that the application that generates them could "buy" some Chirps codes from a web service, and then they could be relayed to a receiver. The Chirp application thus acts as a type of wallet, the sender does not need to be online. The receiver may or may not be online: if the Chirp is for a non-trivial amount, the receiver might want to "cash it in" immediately, by transferring it to an online service which can verify that it has not yet been used. If the Chirp is over-heard by a $3^{rd}$ party, that $3^{rd}$ party may have to "beat" the receiver in cashing it in. They may have to be physically close in order to do this. Secure transfer could be used.

Second, a Chirp application could act in the same way as the security devices currently distributed with UK bank accounts to operate web services: the application may encode normal VISA or other credit/debit card details, and the user may enter a normal PIN. Instead of seeing an 8 digit code to type in to a web service, the device would make Chirp the 8 digit code. The receiver can verify this code with the card network.

Figure 8:
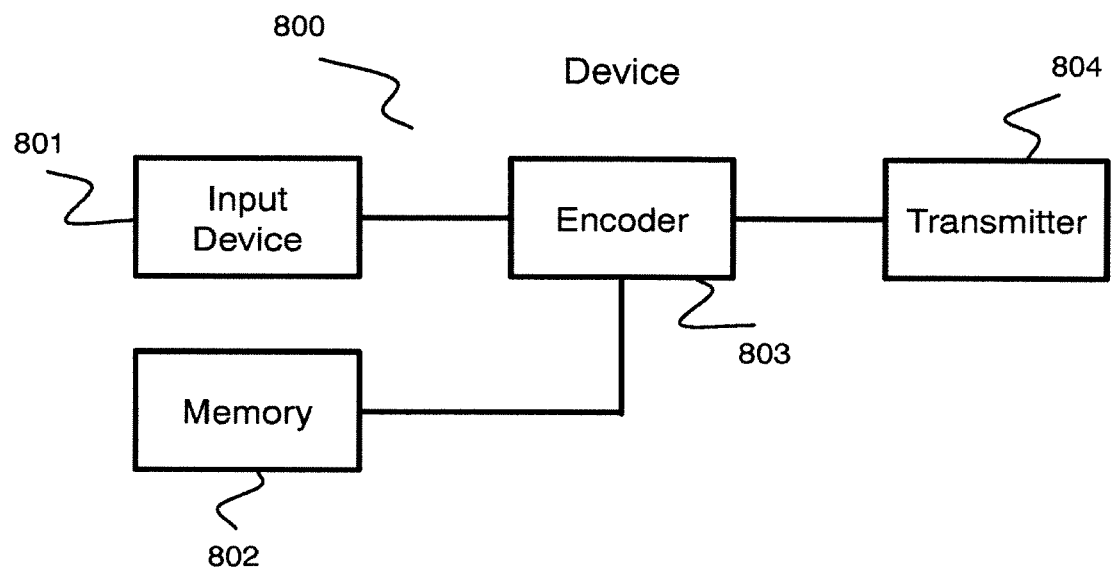
FIG. 8: shows a block diagram illustrating a further device according to an embodiment of the invention.

Referring to FIG. 8, a device 800 according to an embodiment of the invention will be described.

The device 800 shown may comprise an input device 801, a memory 802, an encoder 803, and a transmitter 804. The input device 801 may be configured to receive an authentication input from a user. The memory 802 may be configured to store user identity. The encoder 803 may be configured to encode user identity and the authentication input into a signal in an audibly unique format. The transmitter 804 may be configured to transmit the signal for audible reproduction.

The device 800 may be used to authenticate transactions. Preferably, the transactions are financial transactions and the user identity includes or is associated with user account information. Alternatively, the transactions may be transactions to authenticate the user such as for physical access or access to a wireless network.

The encoder may also encode into the signal the location of the device 800 or an identifier for device 800, such as the IMEI of the device 800. In addition, the recipient device which receives the audible signal may further authenticate the device 800 or user of the device 800 by matching the user identity information to a user and matching the user to a history record of authentication with the user or matching the user to the social network of the user of the recipient device.

The recipient device may also further authenticate the device 800 by calculating whether the device 800 could plausibly be at the location of the recipient device to prevent spoofing by using a prior location of the device 800 at a prior time and calculating whether the travel times between the prior location and the current location are possible.

Figure 9:
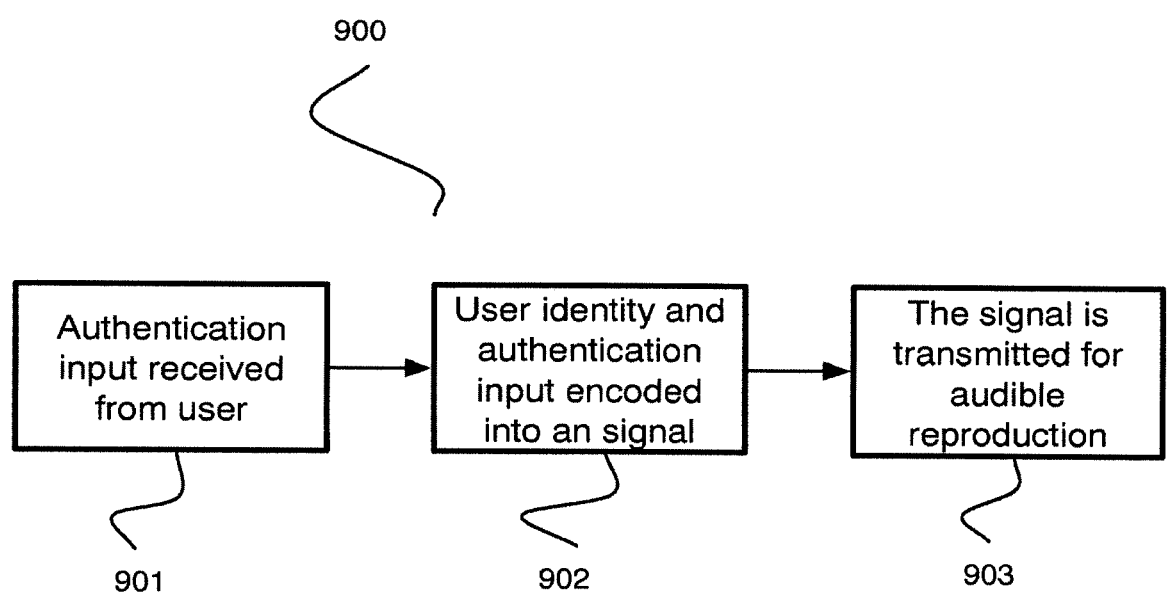
FIG. 9: shows a flow diagram illustrating a further method according to an embodiment of the invention

Referring to FIG. 9, a method 900 according to an embodiment of the invention will be described.

In step 901, an authentication input is received from a user via an authentication input device. In step 902, user identity and the authentication input are encoded into an audio signal in an audibly unique format. In step 903, the audio signal is transmitted for audible reproduction.

Third, a Chirp application might operate as a relay between banking services. That is, the sender would ask an online service for a one-time Chirp code. The receiver would have to cash this in immediately, and the transaction is effectively "closing the loop" between two online banking services.

Combined with the secure services mentioned before, other scenarios can be facilitated using Chirp. Greetings cards with small embedded audio broadcasters could actually reflect a cash value. Micropayments or credits could be broadcast over in-store public announcements systems.

Authentication

As Chirp applications may run on a device, and that device has an owner, multifactor authentication (MFA) can be used. In particular, following the analogy to bank security devices, the Chirp application can access a PIN from the user, but also has access to an ID from the web service, a position history of the user from GPS, the IMEI number of the device. Some or all of this could be encoded into a short code. Other multiple factors could include data from the device camera, accelerometer and social history.

Pairing

The Chirp application could use a Chirp to distribute PINs for a Bluetooth connection. The application could initialize Bluetooth if necessary on the device (it may require user approval through a pop-up menu).

Similarly, pairing schemes could be initialised for WiFi or RFID; anything where a secondary channel is useful to enhance pairing security, or make the user experience smoother.

Games

A particular variant of application steering: is using Chirp to support multi-user games. This would be particularly suitable for slow turn-based games such as strategy games, card games, adventure games, trading games, etc.

Hardware (Chirp-on-Chip)

Embedded chirps could be used in microphone equipped hardware to control devices where the physical interface is either inaccessible or may be more cheaply or conveniently rendered accessible by a controlling mobile device. Chirp can send control messages via audio: possible uses include programming an oven timer, or setting parental controls on a PVR.

Control messages can be sent as a sequence of Chirps. The sequence determining the action on the oven or PVR.

A Chirp receiver may be constructed on a USB dongle. The USB dongle may include a microphone for receiving audio, a decoder to convert the audio into a shortcode, and a mechanism for accessing a web service to obtain the data associated with the shortcode. The mechanism may utilise the wifi capabilities of the computer into which the USB dongle is plugged or the USB dongle may include a wifi transceiver (alternative transceivers can be envisaged such as Bluetooth or other RF to facilitate connection eventually via a network connection to the web service).

URLs and Expiry

As a web service may be used for decoding, different decoding may be performed depending on various characteristics: e.g. location of receiver (e.g. receiver must be near senders location to get the main payload), time, social network (e.g. only friends of a friend), random reward payout (e.g. lottery), identity (e.g. encode a "final recipient" in the chirp, and activate content specific to that person).

Web Application Control

In one embodiment, a web application could be adapted to receive and decode Chirps and use the decoded Chirps to control actions within the web application. In an alternative example, the Chirps can be merely audio, and the web application can match the audio to actions. The audio can be matched using direct mapping to stored audio, fingerprinting, or decoding to a shortcode with the server for the shortcodes to data stored within the web application.

It will be appreciated that the web application could be client-side such as a Java application, or server-side where the Web browser passes audio through to server.

Figure 10:
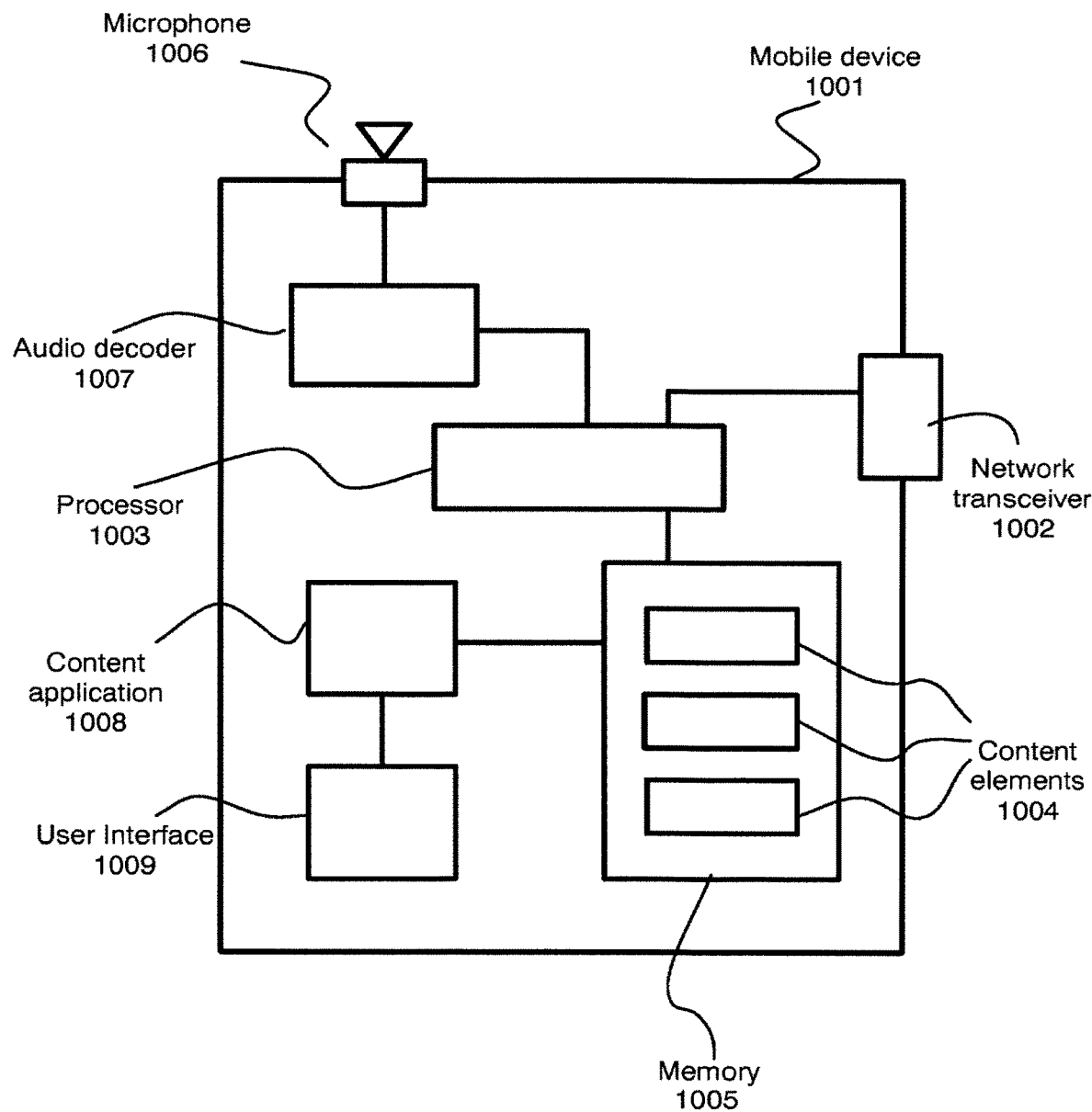
FIG. 10: shows a block diagram illustrating unlocking content on a device using audio according to an embodiment of the invention.

Referring to FIG. 10, a further embodiment of the invention will now be described.

The inventors have discovered that unlocking content previously stored on a mobile device would be useful. Previous systems for unlocking content include downloading a code to access content stored on the device. It would also be desirable for functionality on the device to be unlocked as well.

The content elements may represent virtual goods. Therefore, audio may be used to unlock virtual goods on the device.

In this embodiment of the invention a system for unlocking content on a mobile device 1001 upon receipt of audio will now be described.

In this embodiment of the invention there may be two ways to obtain content/functionality:
1) The content is downloaded when the application is downloaded or obtained;
2) The content is pushed to the device, or pulled to the device by the application. For example, newspaper content could be pushed daily to the mobile device.

An application on the device 1001 may manage content access. For example, the application could automate content access via a network transceiver 1002 when access is available to a wifi connection (i.e. to reduce broadband usage over 3G). The application may be executed by a processor 1003.

The content elements 1004 may be stored on a memory 1005 of the device 1001.

The content 1004 may include a code to unlock it, the content 1004 may be encrypted with a code, or access to the content 1004 may be managed by the application which stores an accessibility code. The code may be a shortcode.

The codes may be unique to the device 1001 or unique to the content 1004.

The content 1004 may be multimedia, URLs, application functionality (for example, to unlock a game, or a new game level), or even new codes.

To obtain access to the content (or to unlock the content), the device 1001 may receive audio from the microphone 1006 of the device 1001. The audio may encode a shortcode within the audio in accordance with the encoding process described in FIG. 3, the audio itself may be the code, or the audio may be fingerprinted to obtain the code. If the audio is encoded it is decoded to a code by an audio decoder 1007.

The code is matched to the content 1004 stored on the device 1001, and provides access to the content. Access to the content may be provided to a user through a user interface 1008 by a content application 1009. For example, the content could be an MP3 and the access could be provided by playing the MP3 on a music player on the device.

In an alternative embodiment, in addition to the code, a further constraint is required to provide access to the content. For example, multiple codes may need to be received, the user device 1001 must be in particular location (as determined, for example, by an onboard GPS chip), or it must be within a particular time period or before/after a particular time.

The audio may be received via peer-to-peer audio transmission from another mobile device, over broadcast on TV or radio, or over a PA system.

The audio may be a chirp as described elsewhere in this specification.

A potential advantage of this embodiment of the invention is that codes may be shared between users while offline. Furthermore, because the code unlocks the content without needing to download the content, instant gratification can also occur offline.

Figure 11:
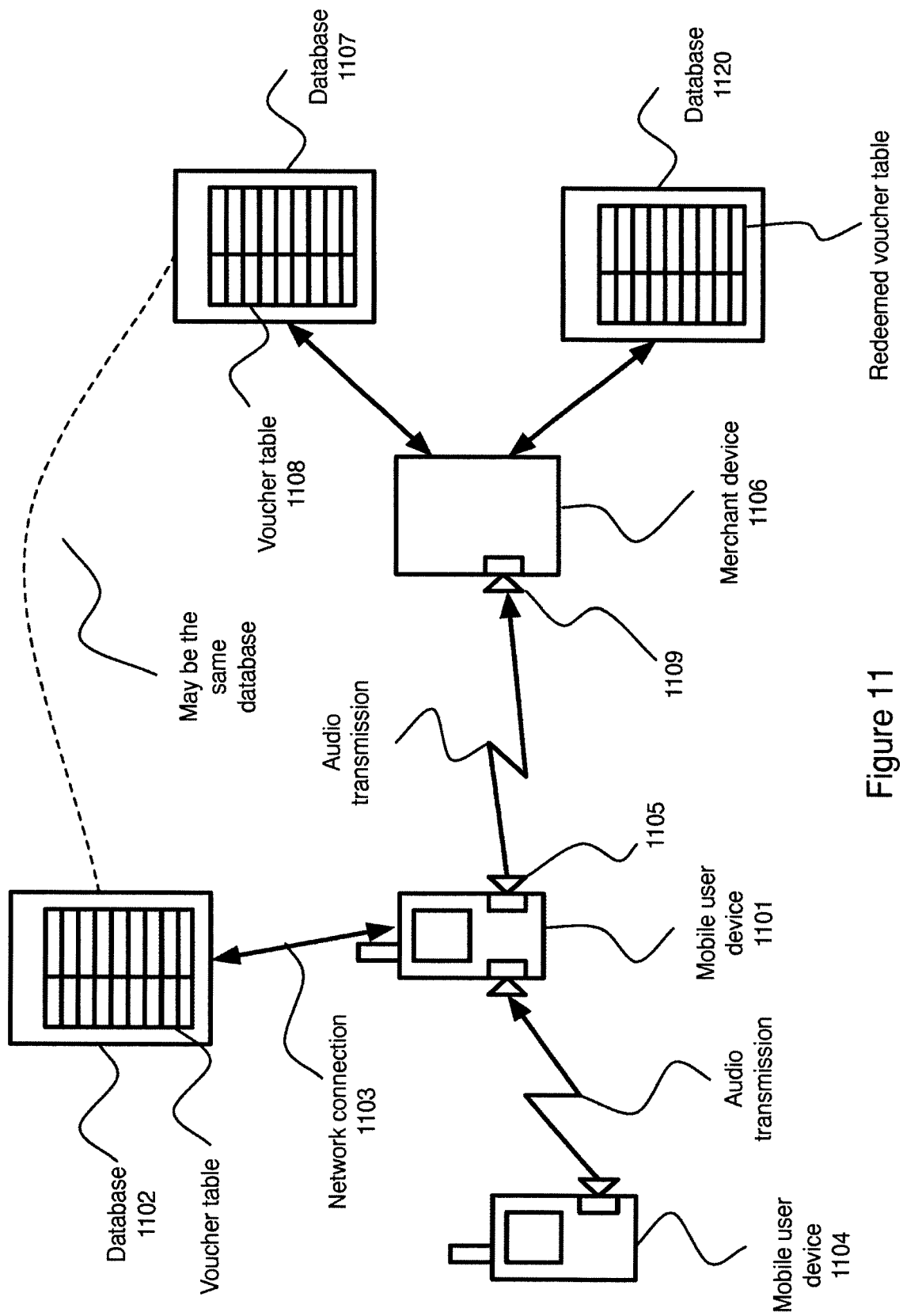
FIG. 11: shows a block diagram illustrating redeeming vouchers using audio according to an embodiment of the invention.

Referring to FIG. 11, a yet further embodiment of the invention will now be described.

A voucher is a token which can redeemed for goods or services. A generic voucher is a voucher which is not specific to a user or transaction. Generic vouchers are presently in paper-form or electronic. Generic vouchers are redeemed by handing or showing the paper-form voucher or displaying the electronic voucher on a visual display, such as a mobile device screen.

The inventors have concluded that it would be desirable to provide an alternative to the prior art to redeem generic vouchers.

An embodiment of the invention where vouchers are redeemed over audio will now be described in detail.

A first user device 1101 is shown. The first device 1101 is preferably a mobile user device such as a smart-phone.

The first device 1101 may receive a voucher from a database 1102 which may be accessible as a web service over a network connection 1103. The voucher may be represented as an identifier for the voucher. Alternatively, the first user device 1101 may receive the voucher in audio from a second user device 1104. The second user device 1104 is preferably a mobile user device. Furthermore, the second user device 1104 may have received the voucher from yet another user device, forming a chain of sharing user devices from a first originator device, which initially received the voucher from the database 1102, to the current device 1101.

Where the voucher is not received in audio form, the voucher may be encoded in audio form in accordance with the encoding method shown in FIG. 3. Furthermore, the first user device 1101 may include a unique user identifier with the voucher identifier when it encodes it into audio.

In one embodiment, the encoded audio may encode in the following format:

voucher identifier+number of shares+originator ID+referrer ID where originator ID is the identifier of the first user to directly share the voucher in the chain, and referrer ID is the identifier of the last user to provide the voucher to the current user. In an alternative embodiment, all users in the chain of sharing from originator to last referrer could be added to the encoded audio. This format may enable later analysis of voucher sharing behaviour.

The audio may be transmitted over an air interface through a speaker 1105 on the first user device 1101.

A merchant device 1106 is shown. The merchant device 1106 may include a database 1107 stored on memory or may merely have access to the database 1107. The database 1107 and the database 1102 may be the same database. The database 1107 will store a plurality of vouchers 1108.

The merchant device 1106 may receive the transmitted audio from the first user device 1105. The audio may received via a microphone 1109 on the merchant device 1106.

The merchant device 1006 may match the received audio to the plurality of vouchers 1108 in database 1107.

The audio may be matched directly to audio stored within the database 1107, via audio fingerprinting, or the audio may encode a shortcode as described in FIG. 3, and the audio may be decoded and the shortcode may be matched to the vouchers 1008.

Information relating to the matched voucher may be displayed on the merchant device 1106 for verification of the value of the voucher. For example, the voucher may indicate that the user of the first user device 1101 is to receive 50% off their purchase or to receive a free gift with their purchase.

There may be constraints on redemption of the voucher. The constraints may be enforced on an application on the first user device 1101 which is responsible for transmitting the voucher, and/or enforced at the merchant device 1106.

The constraints may include a per user limit to the number of vouchers. In this example, the merchant device 1106 may include or have access to a database 1120 for recording user identifiers and vouchers used.

The constraints may include a total vouchers limit, so as to limit redemption of vouchers to the first 100 people (for example).

Constraints may include limiting the location (e.g. particular location of a vendor with multiple locations), or time of possible voucher redemption.

Figure 12:
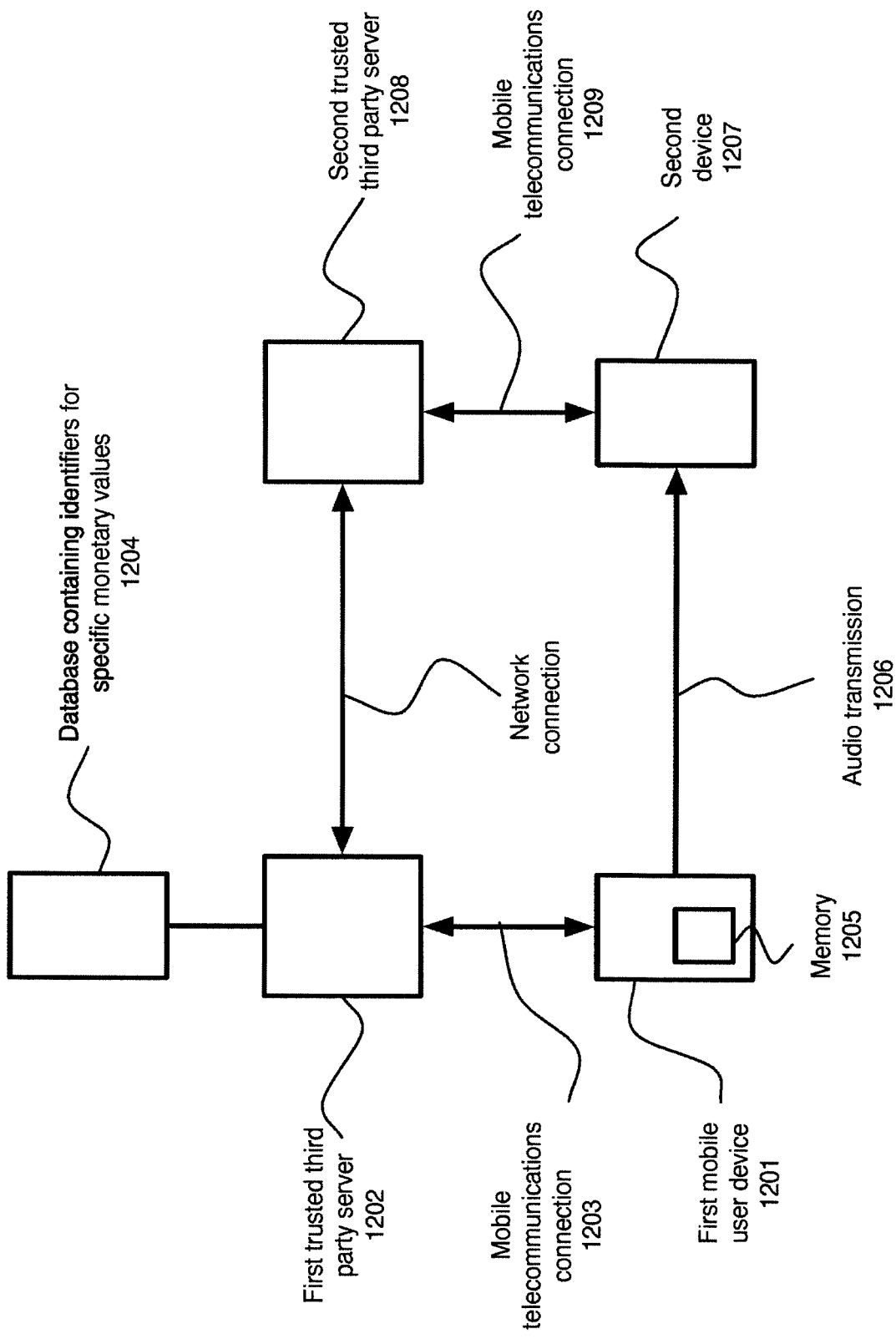
FIG. 12: shows a block diagram illustrating a first system for transferring money using audio according to an embodiment of the invention

Referring to FIG. 12, a yet further embodiment of the invention will now be described.

Money is traditionally transferred between parties using physical tokens such as banknotes, coins, or non-transferable vouchers. The obvious disadvantage of this process is that physical tokens can be easily lost and there is a cost or inconvenience associated with handling.

Other methods for transferring money include electronic means such as credit cards, debit cards, and prepaid cards. Such methods have substantial infrastructure requirements (i.e. specific reading devices) and credit/debit cards also require a user-based authentication process.

The inventors have concluded that it would be desirable for an alternative system for transferring money.

An embodiment of the invention where money is transferred using audio will now be described.

A first mobile user device 1201 is shown. The mobile user device 1201 may be any mobile phone capable of receiving SMS messages with ringtone attachments. Alternatively, the mobile user device 1201 may be a smart-phone capable of receiving and storing audio (in any format, for example MP3, MIDI), or receiving codes and encoding the codes into audio.

The first mobile user device 1201 may request from a trusted third party 1202 (such as a bank) over a mobile telecommunications network 1203 a unique identifier for a specific monetary value.

The trusted third party 1202 may process the request by generating an identifier and storing both the identifier and the specific monetary value in a database 1204. In one alternative, the trusted third party 1202 may instruct debiting of a bank account or other monetary account held by the user of the first mobile user device 1201.

The identifier may be a shortcode (as described in FIG. 3).

The trusted third party 1202 may encode the identifier into a MDL format (as described in FIG. 3) and transmit the encoded identifier to the first mobile user device 1201. Alternatively, the trusted third party 1202 may transmit the identifier directly to the first mobile user device 1201 which can encode the identifier itself. In a further alternative, the identifier can be encoded into the MDL and then into audio by the trusted third party 1202. In a yet further alternative, the identifier could be audio.

The identifier (plain, MDL encoded, or in audio) is stored on a memory 1205 on the first mobile user device 1201. For example, the identifier may be received as a ringtone.

When the user of the first mobile user device 1201 wishes to use the specific monetary value they may play the identifier as audio 1206 through a speaker to a second device 1207. Where the identifier is not in audio format, the first mobile user device 1201 may encode the identifier into audio format (such as described in FIG. 3). The second device 1207 may be a merchant device or another user device.

The second device 1207 may validate the identifier and effect receipt of the specific monetary value by contacting the trusted third party 1202 (or an intermediary 1208) over a communications network 1209, and transmitting the identifier. The second device 1207 may decode the received audio into a shortcode or other code before transmission to the trusted third party 1202. In one alternative, the second device 1207 transmits the identifier by calling the trusted third party 1202 and relaying the audio from the first device 1201 to the trusted third party 1202.

The trusted third party 1202 (or intermediary 1208) verifies the identifier within the database 1204 by matching it to the specific monetary value. The verification step may include constraints on use of the specific monetary value to help prevent fraud—for example, the specific monetary value may be restricted to geographic location (for example, London or the UK), it may be restricted to specific vendors or vendor family (for example, Starbucks), it may be restricted to a specific time, or it may be restricted to a particular purpose (for example, purchase of books only).

In an alternative embodiment, the specific monetary value may be reusable within constraints—for example, the specific monetary value may be usable once daily, or 5 times weekly.

The trusted third party 1202 may mark the identifier as used to prevent repeat usage of the specific monetary value. Once verified, the trusted third party 1202 may effect transfer of the specific monetary value to the bank or other monetary account associated with the second device 1207. The trusted third party 1202 may transmit verification of the validity of the identifier to the second device 1207. Therefore, the second device 1202 or the user of the second device can facilitate the conclusion of the transaction initiated by the user of the first device 1201 (for example, by providing goods or service, or by providing access to a venue).

Furthermore, the above embodiment may be modified by using encryption such as PKI, and this may involve a handshaking process which can occur using audio. However, because the specific monetary value is verified immediately by the second device 1207 this may alleviate the requirements for secure connection between the first 1201 and second device 1207.

In an alternative embodiment to that described above, the first device 1201 may be used as a conduit to verify the transaction for the second device 1207. This may be useful where the first device 1201 is connected but the second device is not 1207.

Figure 13:
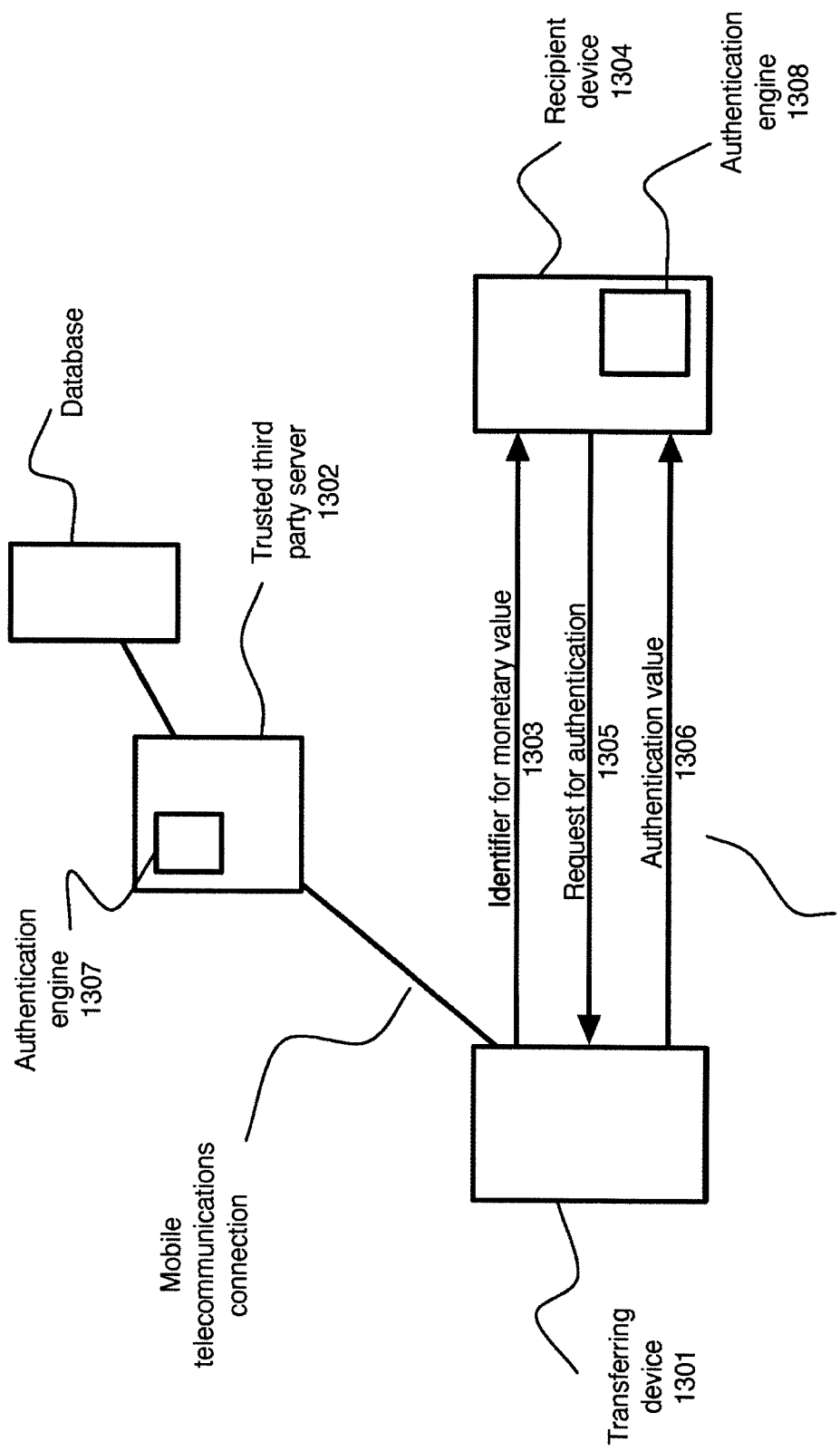
FIG. 13: shows a block diagram illustrating a second system for transferring money using audio according to an embodiment of the invention.

Such an embodiment will be described with reference to FIG. 13.

A first mobile user device 1301 (transferring device) is shown. A specific monetary value is requested by the first device 1301 from a trusted third party 1302. The trusted third party 1302 transmits the identifier for the specific monetary value to the first mobile user device 1301.

The first mobile user device 1301 transmits audio 1303 corresponding to the transaction to a second device 1304 (recipient device).

The second device 1304 may use the first device 1301 as a relay to communicate with trusted third party 1302 to verify the specific monetary value. For example, the second device 1304 may send an encrypted message (authentication request 1305) to be relayed to the trusted third party 1302 and the trusted third party 1302 may respond with an encrypted response (authentication value 1306) that can be verified by the second device 1303. Alternatively, the second device 1303 may request a secret response from the trusted third party 1302 (i.e. an answer to a question that only the second device 1303 and trusted third party 1302 know. The questions may be one-off questions to deter fraud). The trusted third party 1302 and second device 1303 may include authentication engines 1307 and 1308 to manage the authentication process.

The specific monetary values may include payments that would normally be made by in cash, card, or micropayments.

This embodiment of the invention may be used to transfer virtual money.

Referring to FIGS. 14a, 14b, and 14c, a further embodiment of the invention will be described.

Chirp User Interface (UI) is comprised of three screens (S1-3) dedicated to three functions: Listen, Chirp, and Store.

The Chirps referred to in this embodiment are those audio transmissions encoding shortcodes that are described with reference to FIG. 3. However, in an alternative embodiment, the Chirps may also include audio encoding any data such may be used in FIG. 10, 11, 12, 13, or 15.

After initial load, the application defaults to S1 (Listen) to immediately put the application in the correct mode to receive audio data.

(S1) Listen: S1 activates the microphone, puts the device into 'detect' mode and begins to listen for Chirp signals. It displays in real-time all sound events detectable via the microphone (up to and including those not readily detectable or apparent to the human ear) by means of a real-time waveform display.

Users can readily identify a) that their microphone is active, and that b) audio detect level (microphone sensitivity) is suitably set by means of quick visual inspection.

They can also determine that the local environment is c) comparatively noisy or quiet prior to sending or receiving Chirps, and that audio data transfer will be correspondingly difficult or easy to achieve: a measure of peak and ambient environmental sound energy present in the immediately previous few seconds is indicated by dynamically recolouring the waveform: red for bad, yellow for acceptable, green for optimal conditions.

It is anticipated that more than one visual style will be made available to users in order to display these three variables.

Underneath the sound visualisation area, a series of 'tumblers' comprising alphanumeric characters or icons indicates decoded data caught from the over-the-air audio input, as it is detected in order of detection.

S1 also contains a link to S2 (View Chirp button)

(S2) Chirp: S2 aggregates a series of different data protocols for sharing stored or recently captured data. At the top of the screen users can see the last alphanumeric shortcode received, and underneath many available methods for sharing that shortcode including (but not limited) to visual, audible and textual distribution methods.

Within audible methods, pressing the button marked Chirp the code is re-rendered as sound for other Chirp client applications.

Within visual methods, the shortcode is dynamically rendered and displayed as a QR code for possible redemption (via external scanning or image capture device) using EPOS systems. Other open source or proprietary members of the family of 2D visual codes including Aztec Codes, semacodes, Microsoft high-density codes, may also be supported.

Within textual methods, a means is provided for opening a Twitter, email or SMS client application and pre-populating the content field of these applications with the currently active shortcode. All of these operations are achieved in a single click. For added convenience, in the case of Twitter or email sharing, a clickable link for the recipient's benefit is constructed by the Chirp application by simply prepending the code with the correct protocol type and a server address; typically this may be 'http://chirp.io/', whereas (for example) files linked to Chirps might preferably be handled via applications using ftp, or other file-sharing protocols.

All external applications or functions to be invoked may be marked with an icon appropriate to that function.

Lastly, if local files have been activated or made accessible by the detection of a Chirp or receipt of data to the Chirp app by one or other of the means given above, the icon may display an exclamation mark and that content may be made available by clicking the icon or button displaying the content's title (for example, 'Lucky Chirp') and that content (audio, video, graphics, HTML, interactive game data or functions) can be opened by using an appropriate client app, or may be handled by the host application itself.

S2 aggregates all common sharing functions in a single screen, with each sharing method invokable via a single button, and each sub-application intelligently auto-filled.

Alternatively, the clipboard (copy buffer) can be pre-populated with a shortcode string, and users may leave the Chirp application by switching to the 'desktop' or OS level, navigate to their preferred mail, Twitter, 2D code creator applications and paste in a shortcode for either conversion or transmission (or both) from there. The method shown in S2 is preferable as it is demonstrably faster and allows for more efficient sharing, by anticipating the required flow, but not restricting the method of sharing.

A further alternative is to use lightweight 'outbound-only' applications for even quicker load-times using dynamically-created proxy return email or SMS addresses, and/or CC'ing to the appropriate permanent 'real' outbox. In this way (using proxy accounts) Chirps may be conveniently kept separate from other communications if wished.

S2 may also records the number of shares made and mode of sharing for later analysis at the server-side, and for display on S3.

The S3 (Store) interface acts as a repository of unique identifiers that have been matched with Chirps either locally or via a server.

The first section shows recent 'inbox' activity (last 5 Chirps received in reverse order, with a toggle to show last n Chirps received where n is user-defined).

The Chirps may be associated with a status that may be determined by accessing the server or may be determined from information at the device. For example, if the data associated with the Chirp at the server has not yet been uploaded then the status of the Chirp may be "Not Yet Available", or if the data associated with the Chirp has expired (for example, if the data is time-dependent like a limited time offer voucher) then the status of the Chirp may be "Expired", if the Chirp has not yet been accessed at the server then the status may be "Not Accessed", or if the Chirp is associated with conditions of access (such as must be in a particular location or during a particular time) then the status may be related to that condition or the status of the Chirp may be "Hidden"—in which case the Chirp may not even be displayed. The status may be indicated within the user interface by colouration of the background of the Chirp.

The page loosely subdivides items that can be immediately transmitted via audio (the audio representation is stored locally) by user biography, geography or task-context.

Biography may include the user's contact details as a shareable micro-format, homepage/s, and/or work details including social network profile addresses such as Facebook, LinkedIn, Twitter. To prepare these data items for audio transmission, the user may have to enter his or her unique username for each of these services and the Chirp application will return the full http:// address encoded as audio for easy sharing or request disambiguation if no unique username is found.

Geography includes all geo-located URLs, for-example: recently searched-for places on map applications (e.g. taken from user history of map searches) geographic 'check-ins' on location-based social-networks, etcetera. The typical use case is one-click sharing of a proposed meeting place, recommended retailer, etc.

Contextual storage may include items pertaining to one application, or class of applications, or to aspects of the device: e.g. 'favourites' or history for a browser or browsers; recently played music; telephone numbers from recently made phone-calls, email addresses from recently received/sent emails; phone numbers a list of contacts; calendar events; or data relating the most recent activity on the device—for example, if the user has recently viewed the map application and identified a location on it, the data item may be the map location.

The items that can be transmitted may be any locally-stored data such as images stored on the camera roll or the list of apps on the device. In an alternative embodiment, any web-based data may also be transmitted—such items could be Facebook "likes", or Amazon wishlists/recommendations.

In most cases the item string as parsed to determine whether an appropriate file handler or visual representation exists, e.g. twitter.com strings will be handled by a Twitter client (as defined by the user) and given an appropriate icon.

In addition the data items may be 'tokens' relating to games (in-game content that may be bought, sold or traded peer-to-peer) stored locally on the device.

Additionally, in S3 a record of user Chirps received and sent may be displayed, points may be awarded with the points optionally unlocking stored content based on higher share ratios, in order to incentivize the sharing mechanism.

Users may manually 'refresh' a set of data (e.g. Daily Deals) by hitting refresh: the server is then queried for new Chirps (in this case, the special offers of the day) relating to this topic.

In an alternative implementation, the data is auto-refreshed when the application is loaded, or new data is pushed into the relevant set or sets on the client application via a real-time messaging protocol: e.g. over XMPP.

The list of sets that are available may be formed dynamically (i.e. new sets of immediately Chirpable information can be defined on the server and the application on the device can co-ordinate with the server to provide access to the Chirps to the user).

A yet further embodiment will be described with reference to FIG. 15.

To improve the security of transmissions between a first and second device with regard to a man-in-middle attack by a device listening to both the first device and the second device's transmissions, the inventors have discovered that both devices can transmit at the same time. The listening device(s) can detect with a microphone all audio and detect the transmitting device's audio signal by removing their own transmitted signal from the detected audio. This obfuscation process may disadvantage a casual man-in-the-middle attack.

Both devices transmitting audio signals at the same time may also provide an aesthetically pleasing "duet".

Both devices transmitting audio signals at the same time may also reduce data transmission time. This may be particularly useful when sharing encryption keys between two devices when this can be done synchronously.

Figure 15:
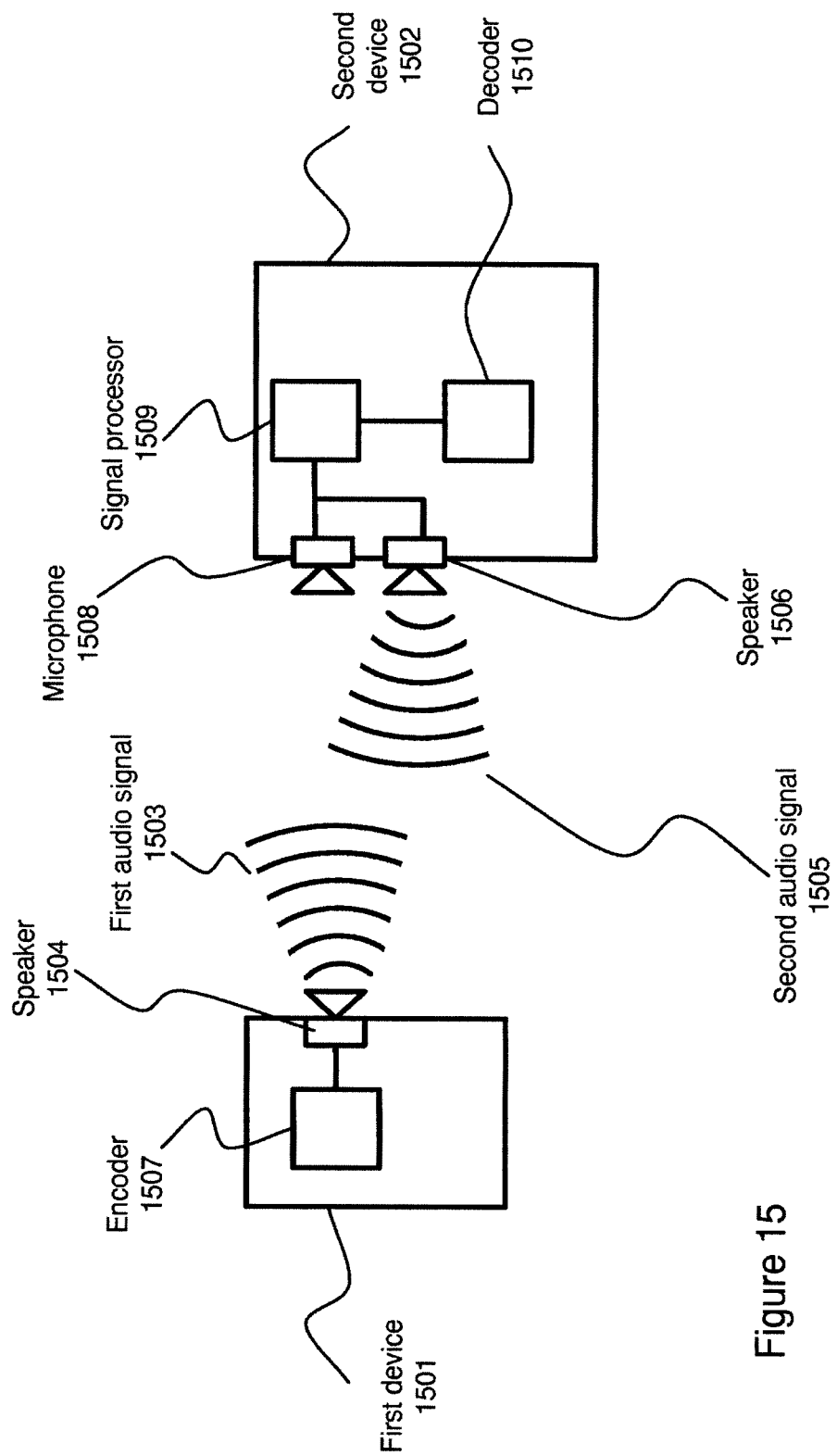
FIG. 15: shows a block diagram illustrating a system for obscuring data transmission between devices using audio according to an embodiment of the invention.

FIG. 15 shows a first device 1501 and a second device 1502. The two devices may initiate an exchange to co-ordinate their later simultaneous audio transmissions. The exchange may occur over a direct air interface using audio, or it may be predefined or co-ordinated through another channel such as through a telecommunications system. The exchange may involve an exchange of tones. The co-ordination may include time synchronisation and reference pitch tones. Preferably at least one of the devices is a mobile telecommunications device.

In an alternate embodiment, the two devices co-ordinate their simultaneous transmissions within the simultaneous transmissions themselves by using the received transmissions of a device in a real-time feedback model to adapt the further transmissions of the device.

The transmissions can be co-ordinated by selecting the same music key, such that simultaneous transmissions may appear more aesthetically pleasing by appearing musical to a listener. Other methods of co-ordinating transmissions may include the devices reproducing audio within a chord (e.g. each device may transmit one or more of a triad of chords).

The first device 1501 may transmit a first audio signal 1503 over a speaker 1504 within the first device 1501. The second device 1502 may simultaneously (or sufficiently simultaneous to result in overlapping audio signals) transmit a second audio signal 1505 over a speaker 1506 within the second device.

The audio signals 1503, 1505 may encode data. The data may be encoded by an encoder 1507 using a method such as described in FIG. 3. Only one 1503 of the audio signals may encode data if the data transmission is one-way. Alternatively, if the data transmission is bi-directional, both audio signals may encode data.

The devices that are receiving a data transmission (i.e. the first and/or second device 1502) may listen for audio using a microphone 1508 and then process the received audio signal to remove their own transmitted signal using a signal processor 1509. The processed signal may be decoded by a decoder 1510 to retrieve any data stored within the audio signal.

In one embodiment, jittering schedules of pitch, timing, and timbre (oscillator waveshape) may be exchanged between the devices to help the obfuscation process. The schedule exchange may be part of the co-ordination phase.

In relation to any audio encoded in the embodiments of the invention, parts of the audio may be encoded to audibly distinguish those features from other features. For example, if protocol includes structural features which are common, such as open and close tags to indicate the presence of data, these features may be defined with a common sound (e.g. bent notes, swoops, trills or aesthetic (non-code-carrying) events). In addition, data may be encoded to assist its distinguishability from related data—for example, data that represents £5 may be encoded to be quite distinguishable from audio that represents £10, and where the data includes other non-common elements, such as encryption, the audio may include common elements to assist with distinguishability—for example, the encrypted part of the audio that represents a £5 token may be combined with a common audio part to indicate that the token represents £5, or an encoded part of the audio that represents a URL or JPEG could include an audio portion that is unique to indicate that the audio relates to URLs, or to indicate that the audio relates to JPEGs or pictures. This audio portion may be decoded by the receiving device or it may exist solely to audibly indicate to listeners the type of content of the audio. As well as indicating the type of data that is encoded, the audio portion may indicate who the data is from (e.g. the transmitter of the audio) or the originator/owner of the data (e.g. the company that originated/owns the data—for example, if the data is a voucher then the company where the voucher is to be redeemed or the voucher-scheme operator).

It will be appreciated that the present invention may be implemented as software executing on computer hardware or within hardware itself.

A potential advantage of some embodiments of the present invention is that, as data is transmitted over audio and all mobile devices are capable of receiving and transmitting audio, the system may be utilised by most mobile devices with minor modifications.

A further potential advantage of some embodiments of the present invention is that data can be communicated between devices when one or both of them are offline.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A device comprising:
a speaker;
a microphone;
a memory configured to store a plurality of vouchers; and
a processor configured to control the device to:
output a first audio signal using the speaker;
receive, via the microphone, a second audio signal including the output first audio signal;
decode a code from the received second audio signal based on removing the first audio signal from the received second audio signal, the code including a voucher identifier, a location associated with the voucher identifier and voucher sharing history information;
determine that the voucher identifier in the obtained code corresponds to a voucher of the plurality of vouchers;
based on the voucher identifier in the obtained code, a physical location of the device corresponding to the location associated with the voucher identifier, and at least one of a) a number of times the voucher is used being less than a voucher limit and b) a time of possible voucher redemption associated with the voucher, provide access to the corresponding voucher stored on the memory for redemption by the device;
update the voucher sharing history information in the code to indicate a number of times the voucher is shared;
generate a third audio signal with the code including the updated voucher sharing history information encoded into the third audio signal; and
output the third audio signal using the speaker for sharing voucher information with another device.

2. The device as claimed in claim 1 wherein decoding the second audio signal includes processing the second audio signal to remove at least a portion of the first audio signal, and obtaining the code from the processed second audio signal.

3. The device as claimed in claim 1 wherein the obtained code includes a voucher identifier of the corresponding voucher and an identifier of a user associated with another device outputting an audio signal including the code.

4. The device as claimed in claim 1 wherein the processor is configured to control the device to receive vouchers periodically over a network connection.

5. The device as claimed in claim 1 wherein the access to the voucher is further dependent on one or more constraints.

6. The device as claimed in claim 1 wherein the access to the voucher is further dependent on receiving a plurality of audio signals.

7. The device as claimed in claim 1, wherein the code is decoded using pitch detection across a plurality of target frequencies.

8. The device as claimed in claim 7, wherein the code is decoded using a Fourier transform and/or tuned filter bank implementation.

9. The device as claimed in claim 2, wherein a length of the code is encoded within the processed second audio signal.

10. The device as claimed in claim 2, wherein the processed second audio signal comprises one or more selected from the set of a front door sound at the beginning of the second audio signal and an end sound at the end of the second audio signal.

11. The device as claimed in claim 1, wherein the processor is further configured to encode a second code into the first audio signal.

12. The device as claimed in claim 11, wherein encoding the second code into the first audio signal includes encoding one or more error-correction notes.

13. The device as claimed in claim 1, wherein the decoding includes detecting one or more error-correction notes and correcting for errors in transmission using a redundant coding scheme based on the one or more error-correction notes.

14. The device as claimed in claim 1, wherein the processor is further configured to encode a second code as a plurality of notes included in the first audio signal and none of the notes within the plurality of notes consecutively repeat.

15. The device as claimed in claim 2, wherein the processed second audio signal includes an application code which specifies an application to process the obtained code.

16. The device as claimed in claim 2, wherein the processed second audio signal includes a sound to indicate that one or more consecutive audio signals are to be subsequently transmitted and received by the processor.

17. The device as claimed in claim 1, wherein the first audio signal is output after at least a portion of second audio signal is received, and the processor is further configured to synchronize the output of the first audio signal to the second audio signal.

18. A computer-implemented method performed by a device, including:
   outputting a first audio signal using a speaker;
   receiving, via a microphone, a second audio signal including the output first audio signal;
   decoding a code from the second audio signal based on removing the first audio signal from the received second audio signal, the code including a voucher identifier, a location associated with the voucher identifier and voucher sharing history information;
   determining that the voucher identifier in the obtained code corresponds to a voucher of a plurality of vouchers stored on the device;
   based on the voucher identifier in the obtained code, a physical location of the device corresponding to the location associated with the voucher identifier, and at least one of a) a number of times the voucher is used being less than a voucher limit and b) a time of possible voucher redemption associated with the voucher, providing access to the corresponding voucher stored on the device for redemption by the device;
   updating the voucher sharing history information in the code to indicate a number of times the voucher is shared;
   generate a third audio signal with the code including the updated voucher sharing history information encoded into the third audio signal; and
   outputting the third audio signal using the speaker for sharing voucher information with another device.

19. The method of claim 18, wherein the first audio signal is output after at least a portion of second audio signal is received, and the output of the first audio signal is synchronized to the second audio signal.

20. The method of claim 18, wherein the first audio signal is output while the second audio signal is received, and decoding the second audio signal includes processing the second audio signal to remove at least a portion of the first audio signal and obtaining the code from the processed second audio signal.

21. The method of claim 18, further comprising receiving synchronization information and reference pitch information, and wherein the first audio signal is output based on the synchronization information and the reference pitch information.

22. The method of claim 18, wherein outputting the first audio signal is concurrent with receiving the second audio signal.

23. The method of claim 18, wherein a portion of the second audio signal is received before the first audio signal is output and the second audio signal is output, based on the portion of the second audio signal, simultaneous with receiving the second audio signal.

24. The method of claim 18, wherein providing access to the corresponding voucher includes displaying the corresponding voucher on a display coupled to the device.

25. The method of claim 18, wherein the obtained code includes an identifier of a user associated with another device outputting an audio signal including the code.

26. The method of claim 18, wherein the voucher sharing history information includes a number of shares of the voucher, an originator identifier identifying a first user to share the voucher and a referrer identifier identifying a last user to share the voucher identified in the code with the device.

27. The method of claim 18, further comprising encoding a second code into at least a portion of the first audio signal, wherein the second code includes a voucher identifier of the corresponding voucher and an identifier of a user associated with the device.

28. The method of claim 18, wherein the received second audio signal includes a fourth audio signal output by another device and the code is encoded in the fourth audio signal.

29. The method of claim 18, wherein the voucher sharing history information includes identifiers for each user in a chain of sharing the voucher from an originator to a user associated with the device.

\* \* \* \* \*